(12) United States Patent
Miki et al.

(10) Patent No.: US 8,014,420 B2
(45) Date of Patent: *Sep. 6, 2011

(54) LABEL SWITCHING TYPE OF PACKET FORWARDING APPARATUS

(75) Inventors: Kazuho Miki, Kokubunji (JP); Kenichi Sakamoto, Tokyo (JP); Koji Wakayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,945

(22) Filed: Aug. 31, 2009

(65) Prior Publication Data

US 2009/0323694 A1 Dec. 31, 2009

Related U.S. Application Data

(63) Continuation of application No. 10/894,058, filed on Jul. 20, 2004, now Pat. No. 7,586,947, which is a continuation of application No. 09/629,706, filed on Jul. 31, 2000, now Pat. No. 6,771,662.

(30) Foreign Application Priority Data

May 30, 2000 (JP) .................................. 2000-164761

(51) Int. Cl.
*H04J 3/22* (2006.01)
(52) U.S. Cl. .................... 370/469; 370/466; 370/467
(58) Field of Classification Search .......... 370/352–354, 370/356, 389, 392, 395.5, 465, 466, 467, 370/469; 709/230, 241
See application file for complete search history.

(56) References Cited

U.S. PATENT DOCUMENTS

| | | | | |
|---|---|---|---|---|
| 6,295,296 B1 * | 9/2001 | Tappan | .................. | 370/392 |
| 6,330,614 B1 * | 12/2001 | Aggarwal et al. | ............. | 709/236 |
| 6,374,303 B1 | 4/2002 | Armitage et al. | ............. | 709/242 |
| 6,501,756 B1 * | 12/2002 | Katsube et al. | ................ | 370/392 |
| 6,577,635 B2 | 6/2003 | Narayana et al. | ........ | 370/395.42 |
| 6,587,457 B1 | 7/2003 | Mikkonen | ...................... | 370/356 |
| 6,608,833 B2 * | 8/2003 | Katsube et al. | ................ | 370/392 |
| 6,657,757 B1 * | 12/2003 | Chang et al. | ..................... | 398/49 |
| 6,683,874 B1 * | 1/2004 | Nagami et al. | ................. | 370/392 |
| 6,697,361 B2 * | 2/2004 | Fredette et al. | ............... | 370/389 |
| 6,912,223 B1 * | 6/2005 | Sloane | ......................... | 370/401 |
| 7,072,346 B2 * | 7/2006 | Hama | ...................... | 370/395.53 |
| 7,076,559 B1 * | 7/2006 | Ghanwani et al. | ............ | 709/230 |
| 7,082,128 B1 * | 7/2006 | Aggarwal | ..................... | 370/389 |
| 7,082,140 B1 * | 7/2006 | Hass | ............................ | 370/466 |
| 7,095,740 B1 * | 8/2006 | Jagannath et al. | ............ | 370/392 |
| 7,203,163 B1 * | 4/2007 | Hundscheidt et al. | ........ | 370/230 |
| 2002/0006112 A1 * | 1/2002 | Jaber et al. | .................... | 370/238 |

FOREIGN PATENT DOCUMENTS

| | | |
|---|---|---|
| JP | 10336249 | 12/1998 |
| JP | 2000022699 | 1/2000 |

* cited by examiner

*Primary Examiner* — Aung S Moe
*Assistant Examiner* — Awet Haile
(74) *Attorney, Agent, or Firm* — Mattingly & Malur, PC

(57) ABSTRACT

A label switching type packet forwarding apparatus having a routing information table in which a forwarding type of a reception packet, output port identification information, and output routing information of a specific layer in the OSI reference model determined by the forwarding type are defined in correspondence with routing information which is found upon reception of a packet, for converting a header of a reception packet in accordance with the packet forwarding type and the output routing information obtained by a table search.

9 Claims, 25 Drawing Sheets

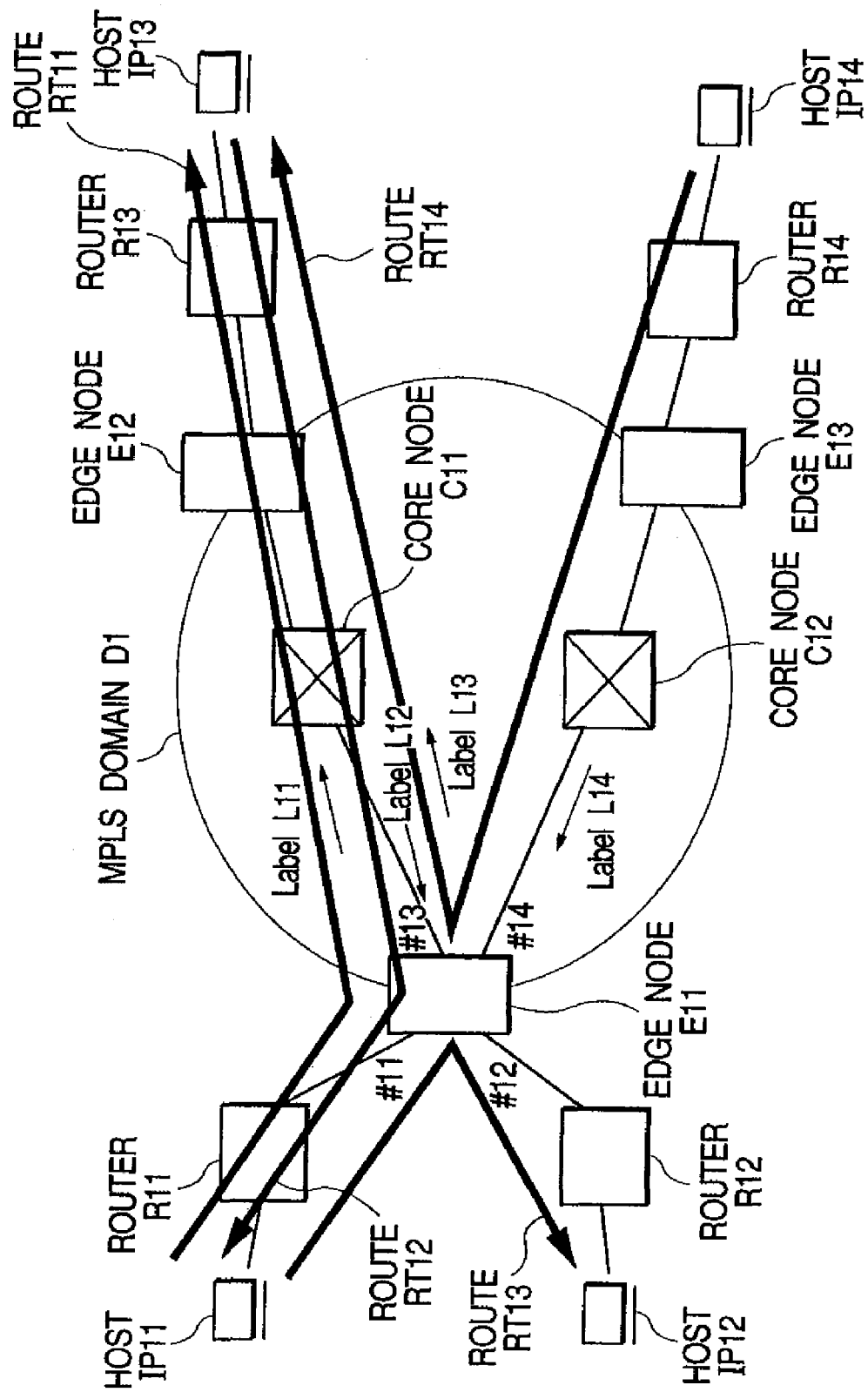

| ROUTE | INPUT INFORMATION ||| OUTPUT INFORMATION ||| |
|---|---|---|---|---|---|---|
| | INPUT PORT No. | INPUT L2 IDENTIFIER | DESTINATION IP ADDRESS | FORWARDING TYPE | OUTPUT PORT No. | OUTPUT L2 IDENTIFIER |
| RT11 | (#11) | — | IP13 | MPLS EDGE-INGRESS | #13 | Label L11 | EN101
| RT12 | (#13) | — | IP11 | MPLS EDGE-EGRESS | #11 | L2inf 1i | EN102
| RT13 | (#11) | — | IP12 | IP | #12 | L2inf 1j | EN103
| RT14 | #14 | L14 | (IP13) | MPLS CORE (POS→POS) | #13 | Label L13 | EN104

IN1 — INPUT INFORMATION
OUT1 — OUTPUT INFORMATION

IN11: INPUT PORT No.
IN12: INPUT L2 IDENTIFIER
IN13: DESTINATION IP ADDRESS
OUT11: FORWARDING TYPE
OUT12: OUTPUT PORT No.
OUT13: OUTPUT L2 IDENTIFIER

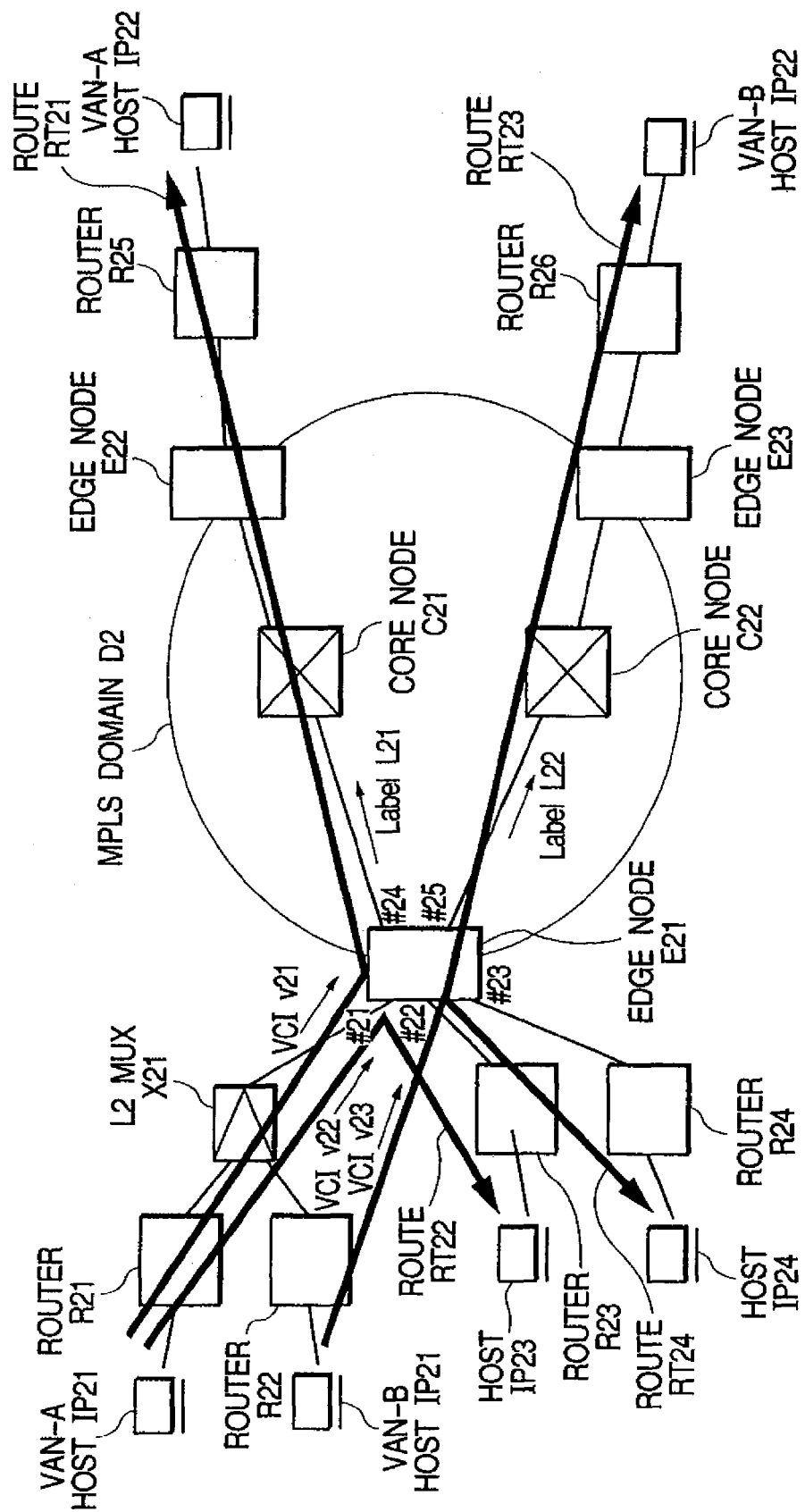

FIG. 14

| ROUTE | INPUT INFORMATION | | | OUTPUT INFORMATION | | | |
|---|---|---|---|---|---|---|---|
| | INPUT PORT No. | INPUT L2 IDENTIFIER | DESTINATION IP ADDRESS | FORWARDING TYPE | OUTPUT PORT No. | OUTPUT L2 IDENTIFIER | |
| RT21 | #21 | VCI v21 | IP22 | MPLS EDGE-INGRESS (VPN A) | #24 | Label L21 | ← EN201 |
| RT22 | #21 | VCI v22 | IP23 | IP | #22 | L2inf 2i | ← EN202 |
| RT23 | #21 | VCI v23 | IP22 | MPLS EDGE-INGRESS (VPN B) | #25 | Label L22 | ← EN203 |
| RT24 | #21 | VCI v23 | IP24 | IP | #23 | L2inf 2j | ← EN204 |

160

IN1 — INPUT INFORMATION (IN11 INPUT PORT No., IN12 INPUT L2 IDENTIFIER, IN13 DESTINATION IP ADDRESS)

OUT1 — OUTPUT INFORMATION (OUT11 FORWARDING TYPE, OUT12 OUTPUT PORT No., OUT13 OUTPUT L2 IDENTIFIER)

| ROUTE | INPUT INFORMATION | | | OUTPUT INFORMATION | | | |
|---|---|---|---|---|---|---|---|
| | INPUT PORT No. | INPUT L2 IDENTIFIER | DESTINATION IP ADDRESS | FORWARDING TYPE | OUTPUT PORT No. | OUTPUT L2 IDENTIFIER | |
| RT11 | (#11) | - | IP13 | MPLS EDGE-INGRESS | #13 | Label L11 | ← EN101 |
| RT12 | (#13) | - | IP11 | MPLS EDGE-EGRESS | #11 | L2inf 1i | ← EN102 |
| RT13 | (#11) | - | IP12 | IP | #12 | L2inf 1j | ← EN103 |

IN1 = {IN11, IN12, IN13}; OUT1 = {OUT11, OUT12, OUT13}

| ROUTE | INPUT INFORMATION | | | OUTPUT INFORMATION | | | |
|---|---|---|---|---|---|---|---|
| | INPUT PORT No. | INPUT L2 IDENTIFIER | DESTINATION IP ADDRESS | FORWARDING TYPE | OUTPUT PORT No. | OUTPUT L2 IDENTIFIER | |
| RT41 | #41 | Label L41 | (IP43) | MPLS CORE (POS→ATM) | #43 | VCI v45 | EN401 |
| RT42 | #44 | VCI v47 | (IP42) | MPLS CORE (ATM→POS) | #42 | Label L43 | EN402 |
| RT43 | #41 | Label L42 | (IP42) | MPLS CORE (POS→POS) | #42 | Label L44 | EN403 |
| RT44 | #43 | VCI v46 | (IP44) | MPLS CORE (ATM→ATM) | #44 | VCI v48 | EN404 |
| | IN11 | IN12 | IN13 | OUT11 | OUT12 | OUT13 | |

IN1 / OUT1

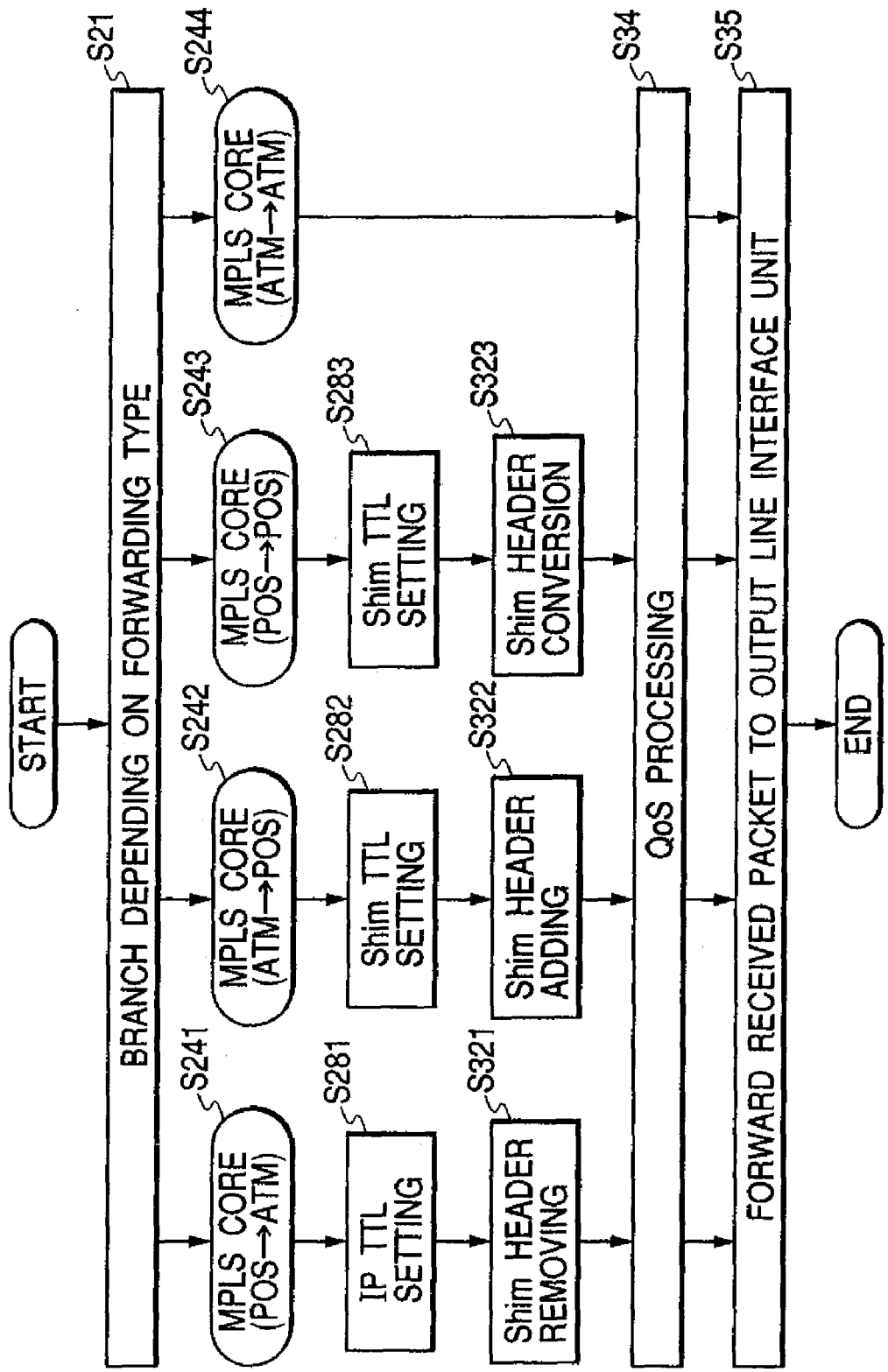

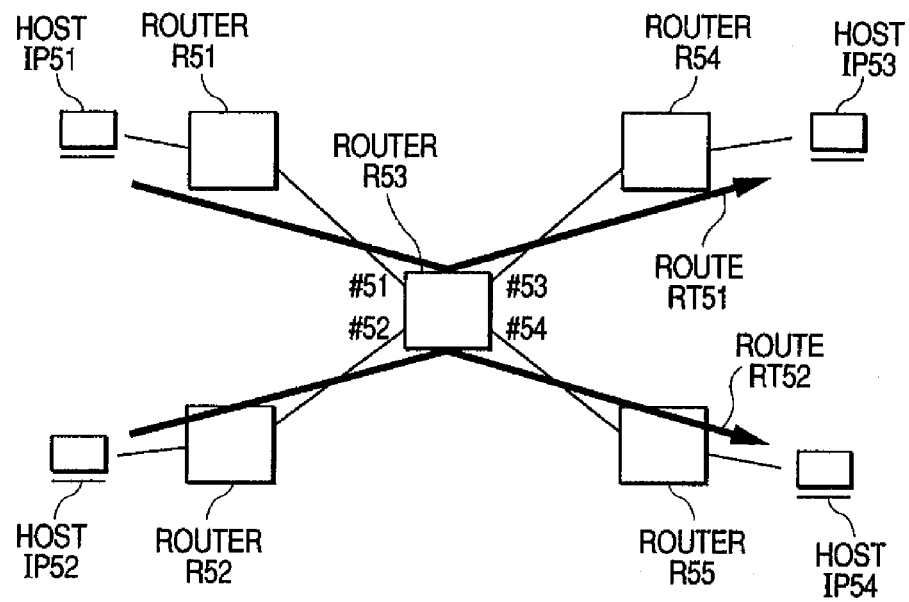

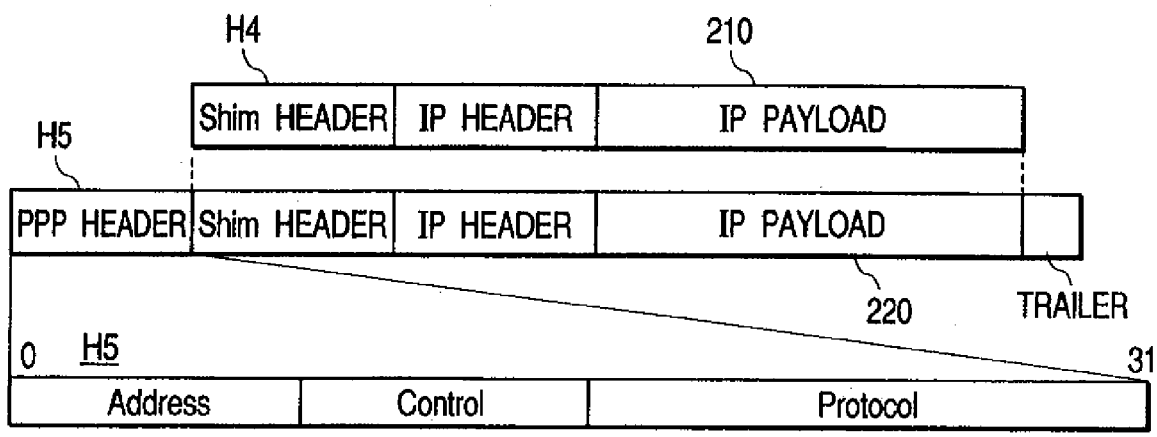

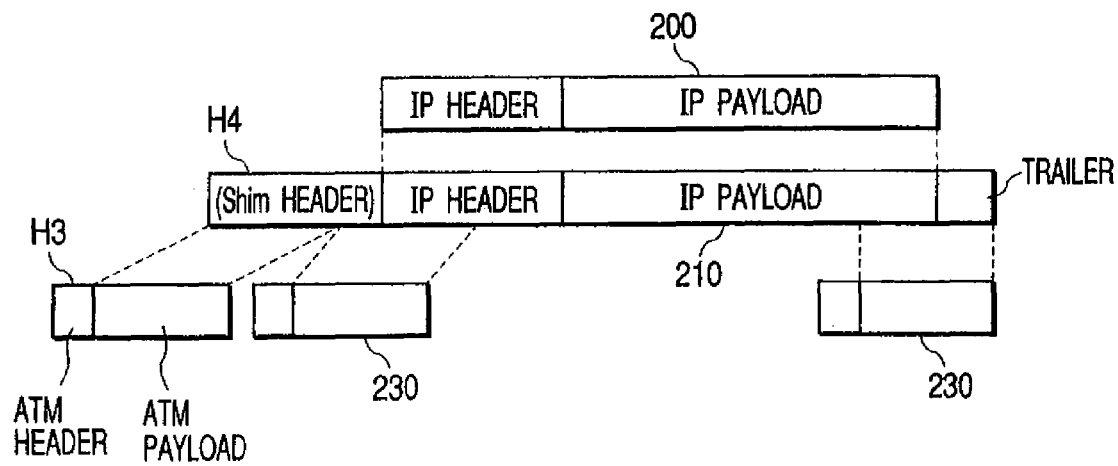

LABEL SWITCHING TYPE OF PACKET FORWARDING APPARATUS

The present application is a continuation of application Ser. No. 10/894,058, filed Jul. 20, 2004 (now U.S. Pat. No. 7,586,947), which is a continuation of application Ser. No. 09/629,706, filed Jul. 31, 2000 (now U.S. Pat. No. 6,771,662), the contents of all of which are incorporated herein by reference.

The application claims priority to JP 2000-164761, filed May 30, 2000.

BACKGROUND OF THE INVENTION (1) Field of the Invention

The present invention relates to a node applied to an IP (Internet Protocol) network and, more particularly, to a label switch type packet forwarding apparatus.

(2) Description of the Related Art

On an IP network typified by the Internet, data is forwarded in accordance with the IP protocol. In recent years, attention is paid to a label switching type packet forwarding for labeling an IP packet and forwarding a reception packet in accordance with the label. A typical example of label switching is MPLS (Multi Protocol Label Switching) which is being standardized by the IETF (Internet Engineering Task Force).

In order to make the Invention understood easily, a conventional technique related to the invention will be described herein below with reference to drawings.

FIG. 20 shows an IP network comprising a plurality of routers R51 to R66 for forwarding IP packets.

Hosts IP51 to IP55 such as terminals or servers as sources or destinations of IP packets are connected to the IP network via the routers. In the IP network shown in the diagram, the router R53 for connecting the routers R51, R52, R54 and R55 has, for example, a routing information table 100 shown in FIG. 21 to determine the forwarding route of a reception packet.

The routing information table 100 comprises a plurality of entries showing the relation among a destination IP address IN51 as input information IN5 a next hop router address IM51 as intermediate information IM5, and output port identifier (output port number) OUT51 and output layer 2 (L2) information OUT52 as output information OUT5.

In the IP network of FIG. 20, for example, when a route of an IP packet transmitted from the host IP51 to the host IP53 is RT51 and a route of an IP packet transmitted from the host IP52 to the host IP54 is RT52, entries EN51 and ENS2 having the contents shown in FIG. 21 are set in the routing information table 100 of the router R53 in correspondence with the routes.

For example, when attention is paid to the route RT51, an IP packet inputted from the host IP51 via the router R51 to the router R53 has an IP header H1 of a format shown in FIG. 22, in which the address of the host IP53 is set as an destination IP address H13. When the IP packet is received from the router R51, the router R53 extracts the destination IP address from the IP header H1 and searches the table 100 by using the destination IP address as input information. By the search, an output port number #53 to which the IP packet is to be forwarded and output L2 information 5i to be added to an output packet are obtained.

When the routing information table 100 is divided into a first table in which the relation between the input information IN5 and the intermediate information IM5 is defined and a second table in which the relation between the intermediate information IM5 and the output information OUT5 is defined, by referring to the second table on the basis of the next hop router address R54 obtained from the first table, the output port #53 and the output L2 information 5i are obtained. When the input information IN5 and the output information OUT5 are directly associated with each other on the same table, the intermediate information IM5 can be omitted.

The output L2 information added to the output packet denotes routing information of the layer 2 (data link layer) of the OSI reference model applied to output lines of the router R53. For example, when the output line is of Ethernet, an MAC destination address H21 in an Ethernet header H2 shown in FIG. 23 corresponds to the output L2 information. When the output line is an ATM line, VPI/VCI H31 in an ATM header H3 shown in FIG. 24 corresponds to the output L2 information. When the output line is of POS (PPP over SONET), as shown in FIG. 31, no information of the layer 2 exists in the POS header. Consequently, in a table entry corresponding to the POS line in the routing table 100, the output L2 information OUT52 is blank.

The router 53 forwards the reception IP packet to the next hop router R54 in a format that the output L2 information which is necessary for a lower layer of the OSI standard model applied to each of the output lines is added. Also on the packet route RT52 having the information of the destination IP address of "IP54", in a manner similar to the route RT51, an IP packet is forwarded to the next hop router R55 in accordance with the output information of the entry EN52 corresponding to the destination IP address set in the routing information table 100.

FIG. 25 shows an example of an IP network including label switching nodes E61 to E63, C61 and C62 for forwarding packets by the MPLS.

In the diagram, an ellipse domain D6 in the center of the network denotes an MPLS domain for forwarding packets by the MPLS. In the following description, the nodes E61, E62 and E63 disposed at the incoming and outgoing ports of the MPLS domain D6 will be called edge nodes and the nodes C61 and C62 disposed on the inside of the MPLS domain will be called core nodes. The edge nodes E61, E62 and E63 are connected to routers R61, R62, R63 and R64 for IP forwarding the packets, respectively, on the outside of the MPLS domain D6.

On the inside of the MPLS domain DP, as shown in FIG. 26, the packet forwarding is performed in an MPLS packet 210 format in which a Shim header H4 is added to an IP packet 200. Each of the edge nodes has a table shown in FIGS. 27 and 28 for determining the forwarding route of a reception packet. FIG. 27 shows an ingress routing information table 110 which is referred to when the forwarding route of a packet inputted from the outside of the MPLS domain D6 into the domain is determined. FIG. 28 shows an egress routing information table 120 which is referred to when the forwarding route of a packet outgoing from the inside of the MPLS domain DP to the outside is determined.

The ingress routing information table 110 comprises a plurality of entries showing the relation between a destination IP address IN61 as input information IN6i, and an output port OUT61 and an output label OUT62 as output information OUT6i. The output label OUT62 corresponds to the value of a label H41 included in the Shim header H4 of the MPLS shown in FIG. 26.

The egress routing information table 120 comprises a plurality of entries showing the relation among a destination IP address IN62 as input information IN6e, a next hop address IM61 as intermediate information IM6e, and an output port OUT63 and output L2 information OUT64 as output information OUT6e. The egress routing information table 120 basically has a structure similar to that of the routing information table 100 shown in FIG. 21 which is referred to in the IP forwarding.

In the IP network shown in FIG. 25, when it is assumed that a route of an IP packet transmitted from the host IP61 to the host IP63 is RT61, a route of an IP packet transmitted from the host IP62 to the host IP64 is RT62, a route of an IP packet transmitted from the host IP63 to the host IP61 opposite to the route RT61 is RT63, and a route of an IP packet transmitted from the host IP64 to the host IP62 opposite to the route RT62 is RT64, in the ingress and egress routing information tables 110 and 120 of the edge node E61, entries EN61, EN62, EN63 and EN64 having the contents shown in FIGS. 27 and 28 are set in correspondence with the routes.

When attention is paid to the route RT61, the IP packet transmitted by the host IP61 to the host IP63 is inputted to the edge node E61 via the router R61. The edge node E61 searches the ingress routing information table 120 by using the destination IP address "IP63" of the reception IP packet as input information and obtains output port number "#63" and an output label "L61". The reception IP packet is converted to an MPLS packet to which the Shim header H4 including the output label "L61" is added and forwarded to the output line having the output port number "#63". In the following description, the packet forwarding from the IP network to the inside of the MPLS domain will be called "MPLS edge-ingress forwarding". Similarly, the reception IP packet of the route RT62 is converted to an MPLS packet including an output label L63 defined by the entry EN62 in the ingress routing information table 110 and the resultant is MPLS edge-ingress forwarded to the output line indicated by the output port number #64.

On the other hand, packets (MPLS packets) received via the routes RT63 and RT64 are forwarded to the outside of the MPLS domain D6 by using the egress routing information table 120 shown in FIG. 28. The packet forwarding from the inside the MPLS domain to the outside will be called "MPLS edge-egress forwarding". Since the routing information table 120 has substantially the same structure as that of the routing information table 100 of FIG. 21 used for the IP forwarding, the detailed description is omitted here.

A packet forwarding performed by a core node in the MPLS domain (hereinbelow, called "MPLS core forwarding") will be described.

FIG. 29 shows a network in which an MPLS domain D7 comprises edge nodes E71 to E74 and a core node C71 and the core node C71 transmits and receives packets on the POS (PPP over SONET) line.

In the MPLS core forwarding on the POS line, as shown in FIG. 31, a PPP header H5 is added to the MPLS packet 210 and the packet forwarding is performed in the format of a PPP packet 220. In this case, the core node C71 has a routing information table 130 shown in FIG. 30 for determining the forwarding route of a reception packet. The routing information table 130 comprises a plurality of entries each including, as input information IN7, an input port number IN71 and an input label IN72 and, as output information OUT7, an output port number OUT71 and an output label OUT72.

In the network of FIG. 29, for example, when it is assumed that the route of an IP packet transmitted from the host IP71 to the host IP73 is RT71 and a route of an TP packet transmitted from the host IP72 to the host IP74 is RT72, the routing information table 130 of the MPLS-POS core node C71 includes, as shown in FIG. 30, entries EN71 and EN72 having contents corresponding to the routes RT71 and RT72, respectively.

When attention is paid to the route RT71, an IP packet transmitted from the host IP71 to the host IP73 is inputted to the edge node E71 via the router R71 and is converted to an MPLS packet having the label value of L71. The MPLS packet is forwarded to the core node C71. The core node C71 which receives the MPLS packet from an input port of the port number "#71" uses the input port number "#71" and the value "L71" of the label (input label) extracted from the Shim header of the reception packet as input information and searches the routing information table 130. In this case, the entry EN71 is hit and the output port number "#73" and the value "L73" of the output label are obtained as output information. Consequently, the label value of the reception packet is rewritten from "L71" to "L73", and the resultant packet is forwarded to the output line of the output port number "#73".

The packet on the route RT72 transmitted from the host IP72 to the host IP74 is processed in a manner similar to the packet on the RT71. The processed packet is subjected to the MPLS core forwarding in accordance with the output information OUT7 in the table entry EN72.

In the MPLS-POS core node as described above, different from the IP forwarding and the MPLS edge forwarding, the routing information table is searched on the basis of the input port number and the label value of the Shim header irrespective of the destination IP address.

FIG. 32 shows a network in which an MPLS domain D8 includes edge nodes E81 to E84 and a core node C81, and a packet forwarding (MPLS-ATM core forwarding) in the MPLS domain D8 is performed in the ATM.

In the ATM, as shown in FIG. 34, the IP packet 200 or the MPLS packet 210 obtained by adding the Shim header H4 and a trailer to the IP packet is divided into a plurality of data blocks each having fixed length (48 bytes). Each of the data blocks is converted to an ATM cell 230 having a cell header H3 of 5 bytes shown in FIG. 24.

The core node (MPLS-ATM core node) C81 for forwarding packets in the ATM has a routing information table 140 shown in FIG. 33 for determining the forwarding route of a reception packet. The routing information table 140 comprises a plurality of entries each including, as input information IN8, input port number IN81 and input VPI/VCI IN82 and, as output information OUT8, output port number OUT81 and output VPI/VCI OUT82.

The reason why input/output VPI/VCI is used in place of the input/output label is that, in the MPLS core forwarding on the ATM line, a packet set in an ATM payload is not always limited to the MPLS packet 210 including the Shim header H4. That is, there is a case such that the conversion from the IP packet 200 to the MPLS packet 210 is omitted, the IP packet 200 having no label H4 is converted to ATM cells, and the ATM cells are MPLS core forwarded.

In the network of FIG. 32, when it is assumed that a route of an IP packet transmitted from a host IP81 to a host IP83 is RT81 and a route of an IP packet transmitted from a host IP82 to a host IP84 is RT82, entries EN81 and EN82 having the contents as shown in FIG. 33 are set in the routing information table 140 in the MPLS-ATM core node C81 in correspondence with the routes.

When attention is paid to the route RT81, an IP packet transmitted from the host IP81 to the host IP83 is supplied to the edge node E81 via the router R81 and converted to ATM cells each having the VPI/VCI value "v81". The ATM cells are inputted to the input port of the port number #81 of the core node C81.

By searching the table 140 by using the value of VPI/VCI of the received ATM cell as input information, the edge node E81 obtains the output port number #83 and the output VPI/

VCI value "v83" defined as output information in the entry EN81. In the reception ATM cell, the VPI/VCI value is rewritten in accordance with the search result and the resultant is forwarded to the output line having the port number of "#83". Similarly, the transmission packet on the route RT82 is also converted into ATM cells which are sent to the MPLS domain D8. Based on the output information defined in the table entry EN82, the ATM cells are forwarded to the output line of the port number "#84".

As described above, different from the node for performing the MPLS core forwarding between the POS lines, the node for performing the MPLS core forwarding between the ATM lines operates like an ATM switch for switching packets on the basis of only the input port number and the VPI/VCI.

When the backbone network of the IP network is replaced by the label switching network, dispersion of a traffic load, increase in efficiency of forwarding of data in the network by designating a route, and construction of a virtual private network VPN are facilitated. As described above, however, since data is forwarded according to the IP protocol in the IP network and data is forwarded according to the MPLS protocol in the MPLS network, there is a large difference in the format of a forwarding packet and a construction of a routing information table between the two networks. Consequently, in the case of constructing an IP network partially having an MPLS domain, an IP router is necessary for the IP forwarding and the MPLS node is necessary for the MPLS forwarding.

Although the MPLS domain includes the edge node and the core node, the packet forwarding format of the edge node and that of the core node are different from each other. A dedicated node is therefore necessary according to each use. Also in the case of performing the MPLS core forwarding, not only the layer 2 protocol process but also, for example, the handling of TTL (Time to Live) to be added to the packet header in the case where the communication line is the POS line are different from those in the case where the communication line is the ATM line. Consequently, a number of kinds of MPLS nodes are required according to the structures of networks. In the construction of the label switching network, there are problems such that the costs of nodes are high and the network control becomes complicated as the number of kinds of nodes increases.

In the case of shifting a part of the IP network to the MPLS, the functions of conventional edge nodes are divided into, as explained with reference to FIG. 25, the function of forwarding a packet from the IP network to the inside of the MPLS domain and the function of forwarding a packet from the inside of the MPLS domain to the IP network. The function of forwarding a packet between IP networks (IP forwarding) is not provided. It causes a problem such that a flexible network in which the scale of the MPLS domain is gradually expanded while performing the IP forwarding by the edge nodes of the MPLS cannot be constructed and a huge amount of funds is necessary for modernization of the network.

When the MPLS is once constructed by using the lines of a certain protocol (such as ATM lines) as a base irrespective of the scale of the MPLS network, it becomes difficult to shift the lines to low-cost lines of another new protocol (such as POS lines) of higher forwarding speed.

SUMMARY OF THE INVENTION

It is an object of the invention to provide a label switching type packet forwarding apparatus which can be adapted to a plurality of kinds of communication protocols.

Another object of the invention is to provide a label switching type packet forwarding apparatus which has a plurality of kinds of communication lines of different communication protocols and can forward packets among the communication lines.

Further another object of the invention is to provide a label switching type packet forwarding apparatus which can deal with a change in communication protocol applied to input/output lines.

In order to achieve the objects, a label switching type packet forwarding apparatus according to the invention is characterized by using a routing information table in which a forwarding type of a reception packet, output port identification information, and output routing information of a specific layer in the OSI reference model determined by the forwarding type are defined in correspondence with routing information which is peculiar to a reception packet and is found upon receipt of the packet.

A label switching type packet forwarding apparatus according to the invention retrieves a table entry corresponding to the routing information of the reception packet from the routing information table, performs a header converting process on the reception packet in accordance with the packet forwarding type and the output routing information of the specific layer indicated by the retrieved table entry, and outputs the reception packet to an output port indicated by the output port identification information in the specific table entry.

More specifically, the routing information table comprises, for example, a table entry corresponding to the destination IP address of a reception packet. The packet forwarding types include, for example, packet forwarding between IP networks, packet forwarding from an IP network to an MPLS network, and packet forwarding from an MPLS network to an IP network. With the construction, a packet forwarding apparatus having both the edge node function and the function of forwarding a packet between IP networks can be realized. By including packet forwarding between MPLS networks in the packet forwarding types, a packet forwarding apparatus having both the edge node function and a core node function can be realized.

In a preferred embodiment of the invention, entries of the routing information table are prepared in correspondence with a combination of routing information of a plurality of layers in the OSI reference model, such as a combination of first information indicative of an input port of a reception packet, second information indicative of either an MPLS (Multi Protocol Label Switching) label or the routing information of the layer 2 in the OSI reference model for the reception packet, and third information indicative of a destination IP address of the reception packet. In this case, the routing information table is searched by, for example, a search at the first stage using at least the first and second information as search conditions and a search at the second stage using the third information as a search condition. The search at the second stage is performed when there is no table entry matched with the search conditions at the first stage.

The other objects and features of the invention will become apparent from the following description of embodiments with reference to the accompanying drawings.

BRIEF DESCRIPTION OF THE DRAWINGS

FIG. 1 shows a first embodiment of a network to which a packet forwarding apparatus of the invention is applied.

FIG. 2 shows an example of a routing information table 150 of an edge node E11 in FIG. 1.

FIG. 13 shows a second embodiment of a network to which the packet forwarding apparatus of the invention is applied.

FIG. 14 shows an example of a routing information table 160 of an edge node E21 in FIG. 13.

FIG. 16 shows an example of a routing information table 170 of an edge node E11 in FIG. 15.

FIG. 18 shows an example of a routing information table 180 of a core node E43 in FIG. 17.

FIG. 19 is a flowchart showing the function of a multi-layer processing unit 42 in the core node E43.

FIG. 20 shows an example of a conventional IP network having a plurality of routers.

FIG. 21 shows the construction of a routing information table 100 of a router R54 illustrated in FIG. 20.

FIG. 30 shows a routing information table 130 of a core node C71 illustrated in FIG. 29.

FIG. 31 shows an example of an MPLS packet format on the POS line.

FIG. 33 shows a routing information table 140 of a core node C81 illustrated in FIG. 32.

FIG. 34 shows the relation among an IP packet 200, an MPLS packet 210 and an ATM cell 230.

DETAILED DESCRIPTION OF THE PREFERRED EMBODIMENTS

Figure 3:
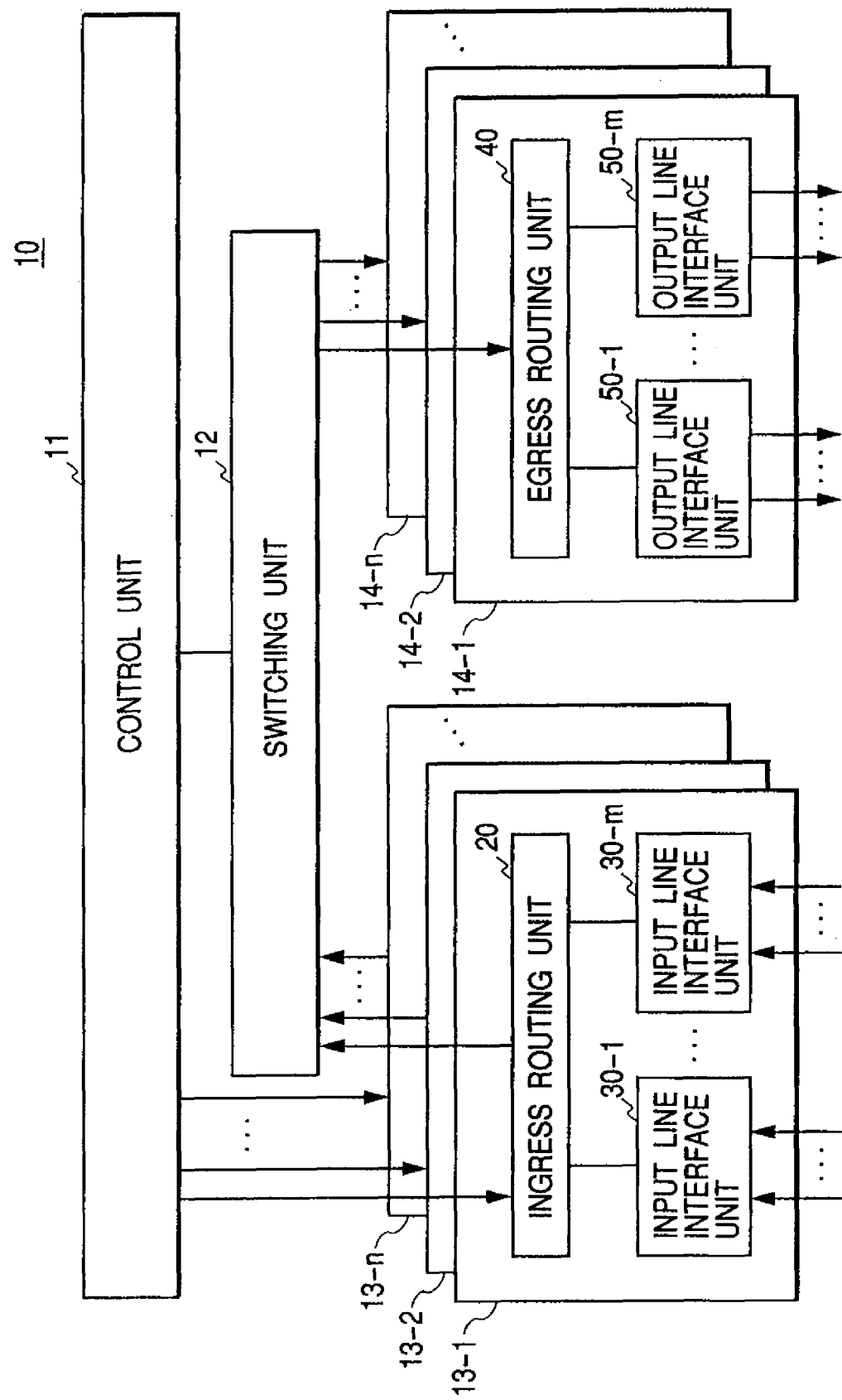
FIG. 3 is a block diagram showing an embodiment of a packet forwarding apparatus 10 of the invention.

FIG. 1 shows an example of a network to which a packet forwarding apparatus (MPLS node) of the invention is applied.

In FIG. 1, a region of an ellipse shape in the center is an MPLS domain D1 for forwarding data in accordance with the MPLS. The MPLS domain D1 comprises: edge nodes E (E11, E12 and E13) as incoming/outgoing ports of the domain; and core nodes C (C11 and C12) for MPLS core forwarding data within the domain. The edge nodes E are connected to routers R (R11 to R14) of an IP network on the outside of the MPLS domain D1. In the embodiment, each of the edge nodes E has not only the IP forwarding function of forwarding a packet received from one of the routers connected to the node to another router connected to the node and the MPLS edge forwarding function of forwarding a packet between the IP network (router) and the MPLS domain D1 but also the MPLS core forwarding function of forwarding a packet received from one node to another node in the MPLS domain D1. By paying attention to the edge node E11, the features of the invention will be described hereinbelow.

In order to determine the routing of forwarding a reception packet, the edge node E11 has, for example, a routing information table 150 shown in FIG. 2. In the routing information table 150, a plurality of table entries EN101, EN102, . . . each comprising of input information IN1 and output information OUT1 are registered. The input information IN1 as a table search key includes routing information of a plurality of layers of the OSI reference model. In the embodiment, the input information IN1 includes input port number of a reception packet as routing information IN11 of layer 1, label information of a reception MPLS packet as routing information (input L2 identifier) IN12 of layer 2, and a destination IP address of a reception packet as routing information IN13 of layer 2. The output information OUT1 as a table search result includes: forwarding type OUT11 of a packet; output port number OUT12 to which the reception packet is to be forwarded; and output layer 2 (L2) identifier OUT13 indicative of routing information to be added to an output packet.

The type of header information designated by the output L2 identifier OUT13 varies according to the forwarding type OUT11 of a packet. In the embodiment, the forwarding type OUT11 indicates one of IP forwarding, MPLS edge-ingress forwarding, MPLS edge-egress forwarding, and MPLS core forwarding (POS-POS). The MPLS edge-ingress forwarding denotes forwarding of a reception packet from the IP network to another node in the MPLS domain. The MPLS edge-egress forwarding denotes forwarding of a reception packet from another node in the MPLS domain to the IP network side.

One of the features of the embodiment is that the routing information table 150 is common to a table for IP forwarding of a reception packet (reception data) (entry EN103), a table for MPLS edge-ingress forwarding (entry EN101), a table for MPLS edge-egress forwarding (entry EN102), and a table for MPLS core forwarding (POS-POS) (entry EN104), and each of the table entries defines the packet forwarding type and header information (output L2 identifier) according to the packet forwarding type.

Figures 26, 27, 28:
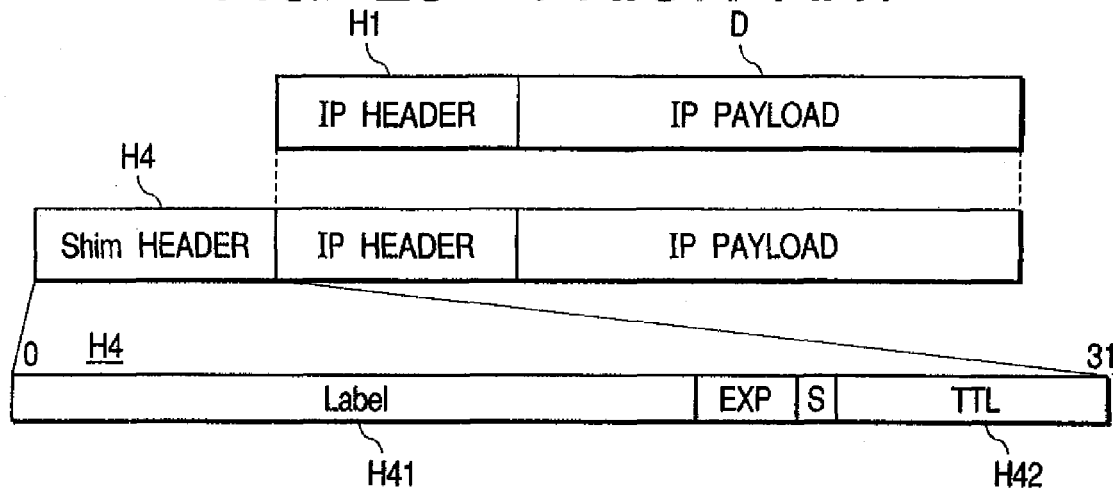
FIG. 26 shows a format of an MPLS packet forwarded within the MPLS domain.
FIG. 27 shows an ingress routing information table of the edge node E61 illustrated in FIG. 25.
FIG. 28 shows an egress routing information table of the edge node E61 illustrated in FIG. 25.
Figure 29:
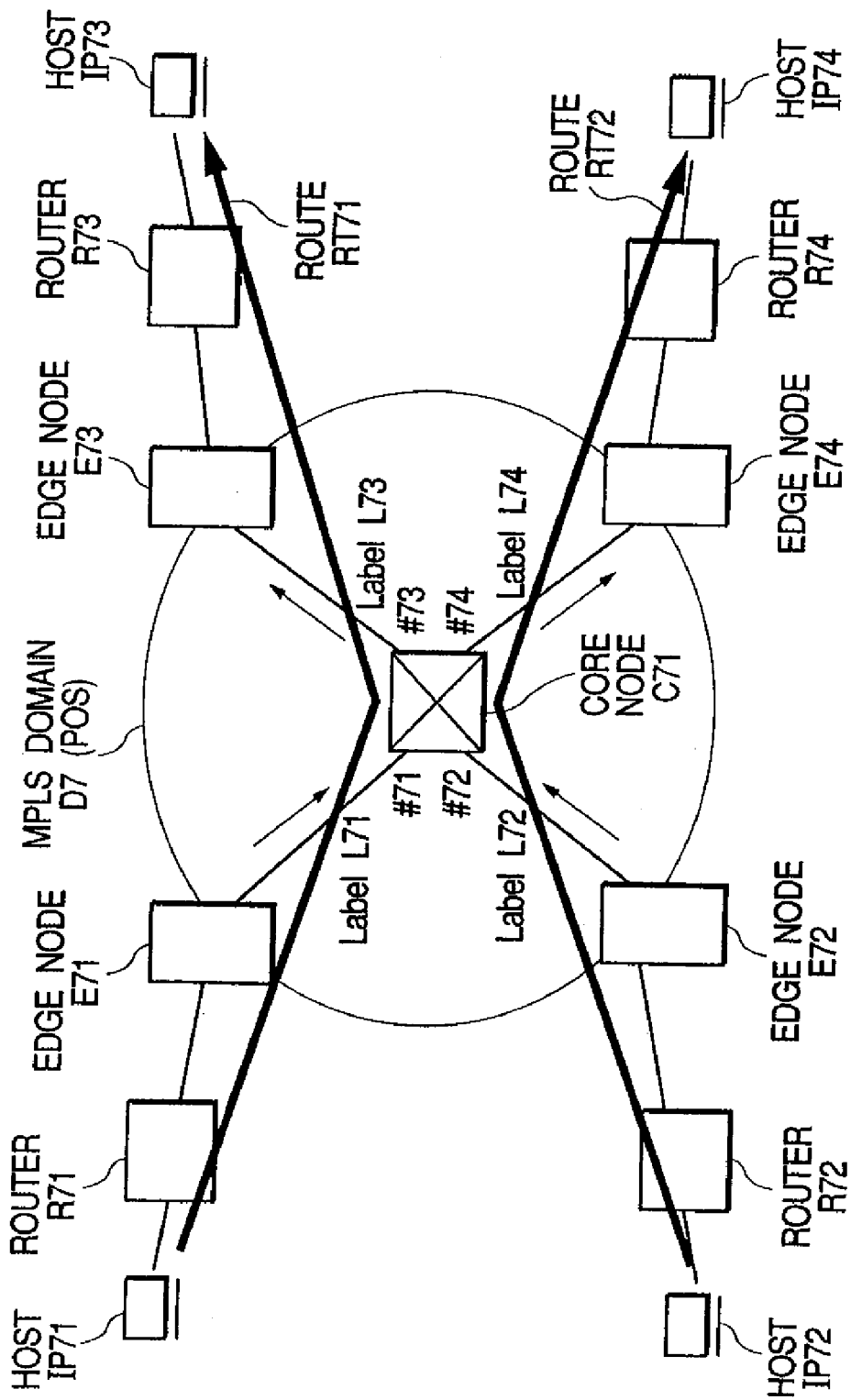
FIG. 29 shows an example of a conventional IP network including a label switching type core node C71 connected to another node via a POS line.
Figure 32:
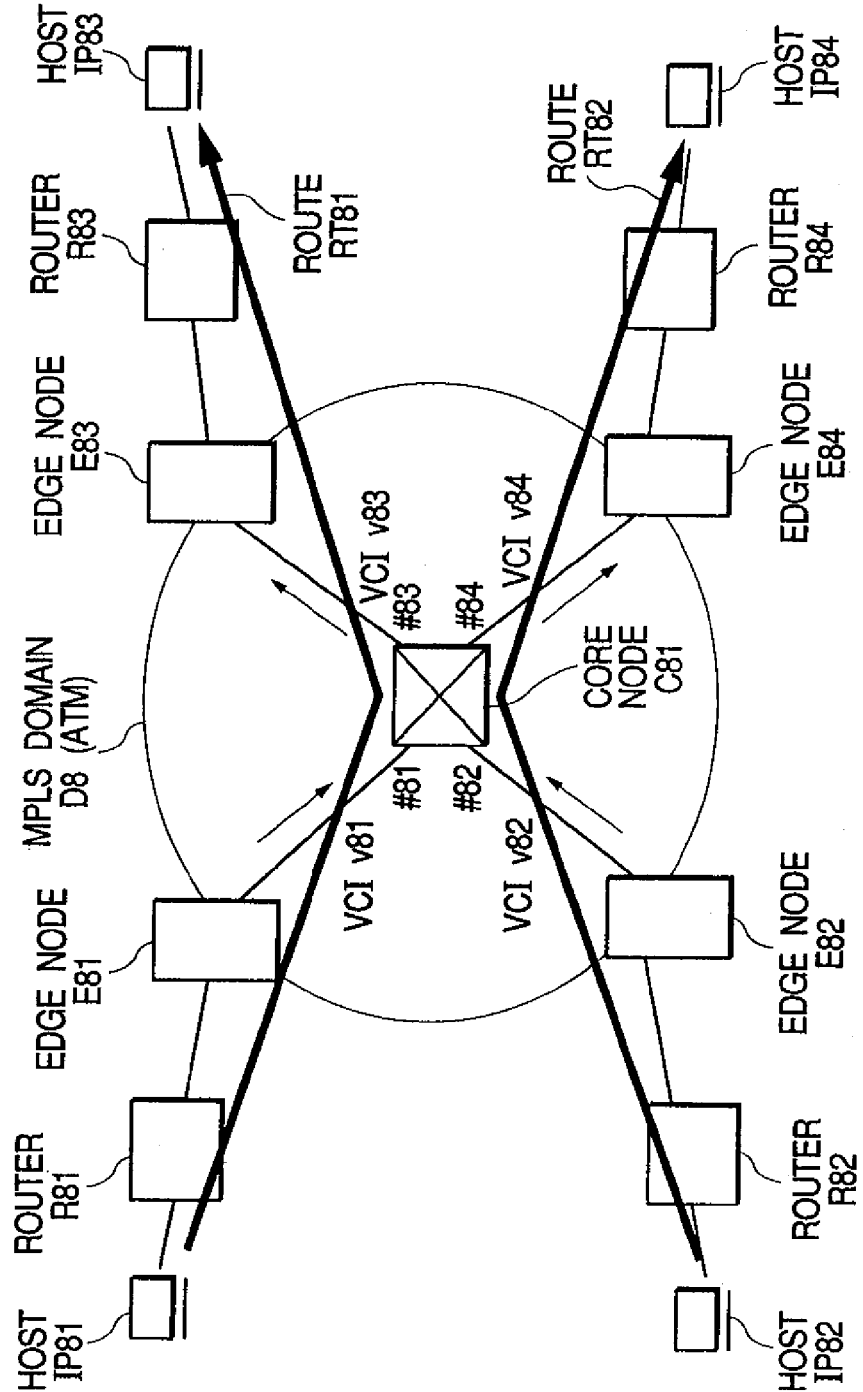
FIG. 32 shows an example of a conventional IP network including a label switching type core node C81 connected to another node via an ATM line.

For example, when the packet forwarding type OUT11 indicates the MPLS edge-ingress forwarding and the MPLS core forwarding, the output L2 identifier OUT13 indicates the value of a label (output label) to be added to the header of the output MPLS packet. The output label differs according to the protocol of a lower layer applied to the output line on the MPLS domain side of the edge node E11. For example, when the output line is of POS or Ethernet, the output label corresponds to a label H41 in the Shim header format of the MPLS shown in FIG. 29. When the output line is of ATM, the output label corresponds to VPI/VCI H31 in the ATM header format shown in FIG. 27.

Figure 25:
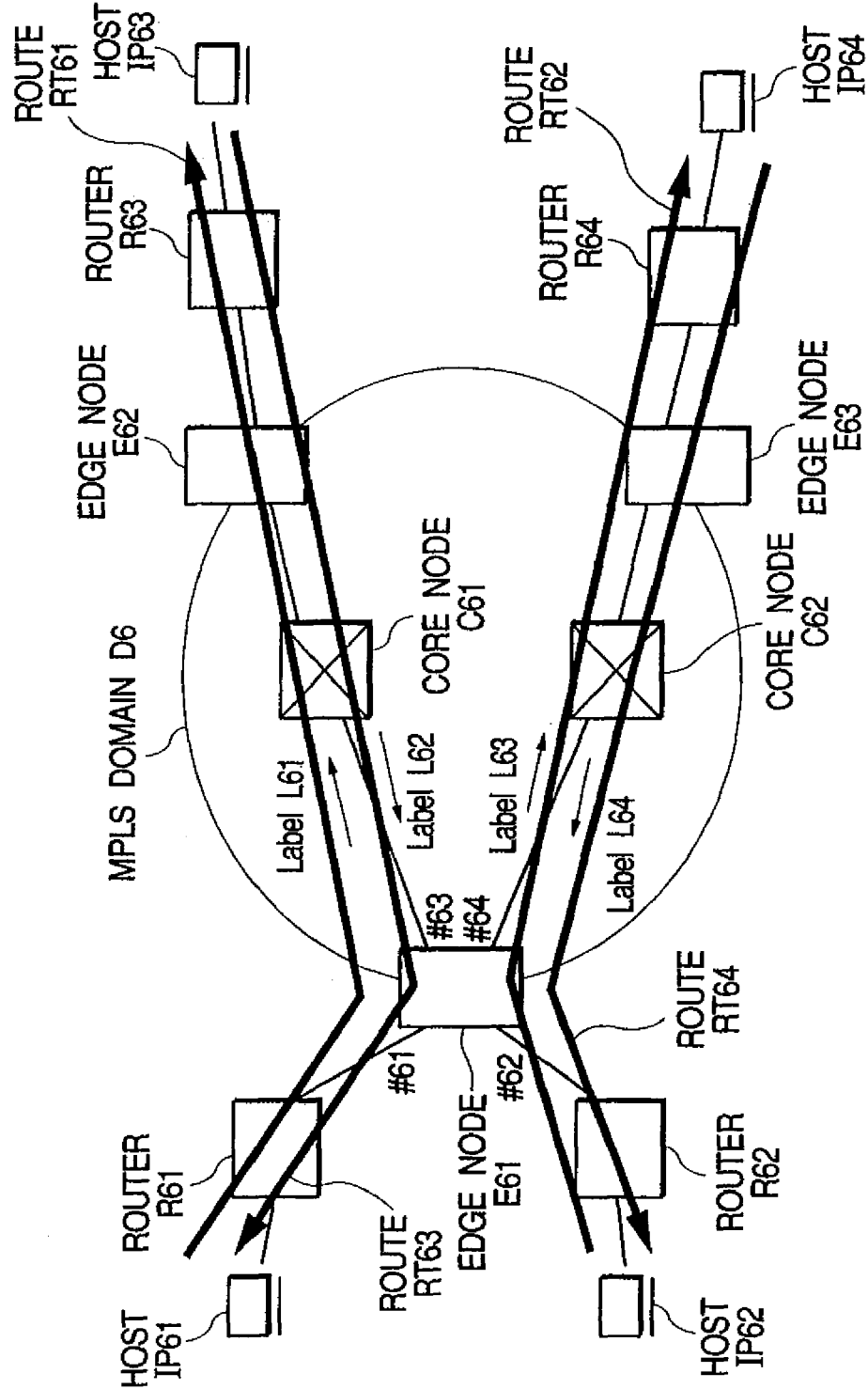
FIG. 25 shows an example a conventional IP network including a label switching type edge node E61 and a core node.

When the packet forwarding type OUT11 indicates the IP forwarding and the MPLS edge-egress forwarding, the output L2 identifier OUT13 shows routing information of layer 2 (output L2 information) to be added to the output IP packet. The output L2 information differs according to the protocol of a lower layer applied to the output line. For example, when the output line is of Ethernet, the output L2 information corresponds to an MAC destination address H21 in the Ethernet header format shown in FIG. 25. When the output line is of the ATM, the output L2 information corresponds to VPI/VCI H31 in the ATM header format shown in FIG. 26. When the output line is of the POS, since there is no identifier corresponding to the POS, the column of the output L2 information OUT11 is blank.

In the embodiment, the MPLS protocol is classified as layer 2 for convenience since the IP protocol which is in the layer 3 of the OSI reference model is treated as a reference in the IP network field and the MPLS lower than the IP protocol is considered to be in the layer 2. As the MPLS is positioned higher than Ethernet and PPP defined as in the layer 2 in the OSI reference model, it is proper that the MPLS protocol is in the layer 2.5 which is between the layer 2 and the layer 3. In the embodiment, therefore, the input L2 identifier IN12 and the output L2 identifier OUT13 in the routing information table 150 denote routing information of the layer 2 to be added to the forwarding packet on the IP network or routing information of the layer 2.5 to be added to the forwarding packet on the MPLS network.

In the network construction of FIG. 1, when it is defined that a route of an IP packet transmitted from a host IP11 to a host IP13 is RT11, a route of an IP packet transmitted from the IP13 to the host IP11 opposite to the route RT11 is RT12, a route of an IP packet transmitted from the host IP11 to the host IP12 is RT13, and a route of an IP packet transmitted from a host IP14 to the host IP13 is RT14, each of table entries EN101 to EN104 corresponding to the routes RT11 to RT14 has the input and output information IN1 and OUT1 of the contents shown in FIG. 2. An input item of which value is shown in parenthesis in the routing information table 150 denotes a "don't care value" such that whatever the value given as a search key is, the value satisfies the search conditions related to the item. An input item in which hyphen is set for convenience denotes that no information corresponding to the item exists in the reception packet corresponding to the table entry and, (even if corresponding information exists), the search condition regarding the item is not satisfied.

As will be described herein later, the routing information table 150 is searched at two stages on the basis of internal header information added to a reception packet by each of line interfaces. In the search at the first stage, the table is searched by using all of the items (input port number IN11, input L2 identifier IN12 and destination IP address IN13) of the input information IN1 as search keys (search conditions). When there is a hit entry, the reception packet is processed according to the output information OUT1 of the entry. When there is no hit entry in the search at the first stage, by using the destination IP address IN13 as a specific item as a search key, the table search at the second stage is executed. The reception packet is processed according to the output information OUT1 of the hit entry.

For example, when attention is focused on the route RT11, an IP packet transmitted from the host IP11 to the host IP13 is supplied via the router R11 to the input port having the port number "#11" in the edge node E11. In this case, in the table entry EN101 in which the input port number IN11 is "#11", a hyphen is set as the value of the input L2 identifier IN12. Consequently, the search at the first stage fails and table search at the second stage by using the destination IP address "IP13" as a search key is executed. Since the entry EN101 is retrieved by the table search at the second stage, the reception packet is subjected to a protocol process for "MPLS edge-ingress forwarding" indicated by the forwarding type OUT11 and is forwarded as an MPLS packet added with a label "LabelL11" indicated by the output L2 identifier OUT13 to the output port of the port number "#13" indicated by the output port number OUT12.

When attention is focused on the route RT12, an IP packet transmitted from the host IP13 to the host IP11 is forwarded to the edge node E12 via the router R13. The IP packet is converted to an MPLS packet in the edge node 12 by a manner similar to that of the edge node E11. The MPLS packet is supplied via the core node C11 from the input port having the port number "#13" to the edge node E11. At this time, the label of the input MPLS packet is converted to "L12" by the label switching in the core node C11. The edge node E11 executes the table search at the first stage by using the input port number "#13", the input L2 identifier "L12" and the destination IP address "IP11" of the reception packet as search keys. In this case, in the entry EN1012 in which the input port number IN11 is "#13", a hyphen is set as the value of the input L2 identifier IN12, the table search fails and the table search at the second stage by using the destination IP address "IP11" as input information is executed. By the table search at the second stage, the entry EN102 is retrieved and the reception MPLS packet is transmitted to the output port of the number "#11" indicated by the output port number OUT11 in the entry EN102 by the MPLS edge-egress forwarding shown by the forwarding type OUT11. In this case, the reception MPLS packet is converted to an IP packet having output L2 information "L2inf 1$i$" in accordance with the output L2 identifier OUT13.

When attention is paid to the route RT13, an IP packet transmitted from the host IP11 to the host IP12 is inputted via the router R11 to the input port of the port number "#11" of the edge node E11. In this case, in a manner similar to the reception packet of the route RT11, the table search at the first stage fails and the entry EN103 is retrieved by the table search at the second stage by using the destination IP address IP12 as input information. The reception packet is, therefore, transmitted to the output port of the number "#12" indicated by the output port number OUT12 in the entry EN103 by the IP forwarding shown by the forwarding type OUT11. At this time, the reception packet is converted to the IP packet which includes the output L2 information "L2inf 1$j$" indicated by the output L2 identifier OUT13 in the layer 2 header.

When attention is focused on the route RT14, an IP packet transmitted from the host IP14 to the host IP13 is inputted via the router R14 to the edge node E13 and is converted to the MPLS packet by the edge node E13. After that, the MPLS packet is inputted to the input port of the port number "#14" in the edge node E11 via the core node C12. The label of the MPLS packet is changed to "L14" by the label conversion of the core node C12. In this case, the entry EN104 is retrieved by the table search at the first stage, the received MTLS packet is forwarded to the output port of the port number "#12" indicated by the output port to number OUT12 in the entry EN104 by the MPLS core forwarding (POS-POS) indicated by the forwarding type OUT11. At this time, the label of the reception MPLS packet is converted to "LabelL13" indicated by the output L2 identifier OUT13.

As obviously understood from the above description, in the present invention, by defining the output information including the forwarding type OUT11 in each of the entries in the routing information table 150 which is referred to on the basis of the routing information (input port identifier and header information) of a reception packet, a plurality of kinds of packet forwarding of different protocol processes can be performed by a single MPLS node. In the embodiment shown in FIGS. 1 and 2, the label information of the layer 2.5 to be added to the forwarding packet in the MPLS network and routing information (layer 2 information) of the layer 2 to be added to the forwarding packet in the IP network are defined in a lump as a "layer 2 identifier". By setting the output L2 identifier indicative of the label information or the layer 2 information to be added to the output packet as output information of each of the entries in the routing information table 150, both the IP forwarding function and the MPLS forwarding function can be realized by a single MPLS node.

FIG. 3 shows an embodiment of a label switching type packet forwarding apparatus (hereinbelow, called an MPLS node) 10 according to the invention typified by the above-described edge node E11.

The MPLS node 10 comprises a control unit 11, a switching unit 12, and a plurality of input line interface boards 13 (13-1 to 13-*n*) and output line interface boards 14 (14-1 to 14-*n*) which are connected to the switching unit 12.

Each of the input line interface boards 13 comprises an ingress routing unit 20 connected to the switching unit 12, and a plurality of input line interface units 30 (30-1 to 30-*m*) connected to the ingress routing unit 20. A plurality of input lines each having peculiar input port number are connected to each of the input line interface units 30. The routing information table 150 shown in FIG. 2 is a part of the ingress routing unit 20. The table entries are updated by the control unit 11.

On the other hand, each of the output line interface boards 14 comprises an egress routing unit 40 connected to the switching unit 12 and a plurality of output line interface units 50 (50-1 to 50-*m*) connected to the egress routing unit 40. A plurality of output lines each having a peculiar output port number are connected to each of the output line interface units 50. An output line interface unit 50-*j* of an output line interface board 14-*i* corresponds to an input line interface unit 30-*j* of an input line interface board 13-*i*. That is, the MPLS node 10 has a plurality of pairs of input and output lines.

Figure 4:
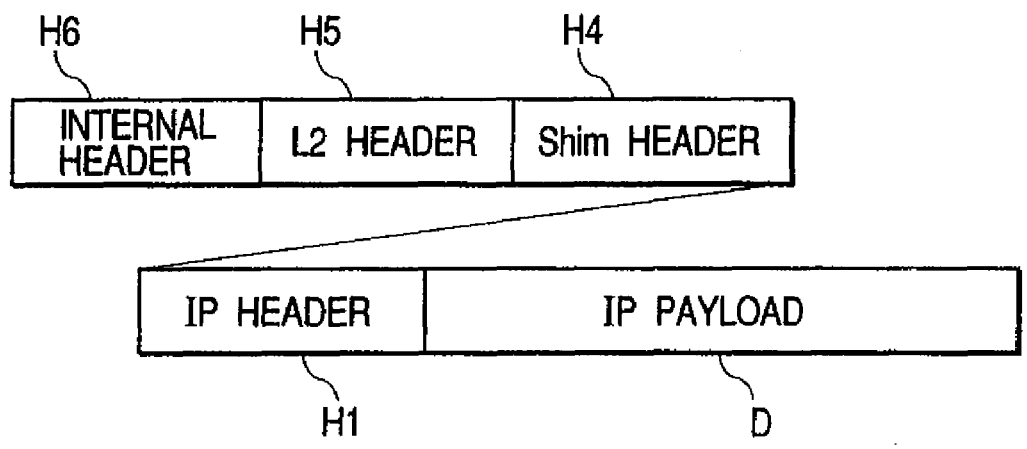
FIG. 4 is an example of a packet format used in the packet forwarding apparatus 10.

Each of the input line interface units 30 performs protocol processes of the layer 1 and layer 2 on a packet (or ATM cells) received from an input line and forwards the reception packet to the ingress routing unit 20. At this time, an internal header H6 is added to the reception packet as shown in FIG. 4. FIG. 4 shows, as an example of a reception packet, an MPLS packet obtained by adding the Shim header H4 and the L2 header H5 to an IP packet comprising of the IP payload D and the IP header H1. The format of the reception packet differs according to a communication protocol applied to each of the input lines. For example, a reception packet from the input line connected to the IP network does not include the Shim header H4.

Figure 5:
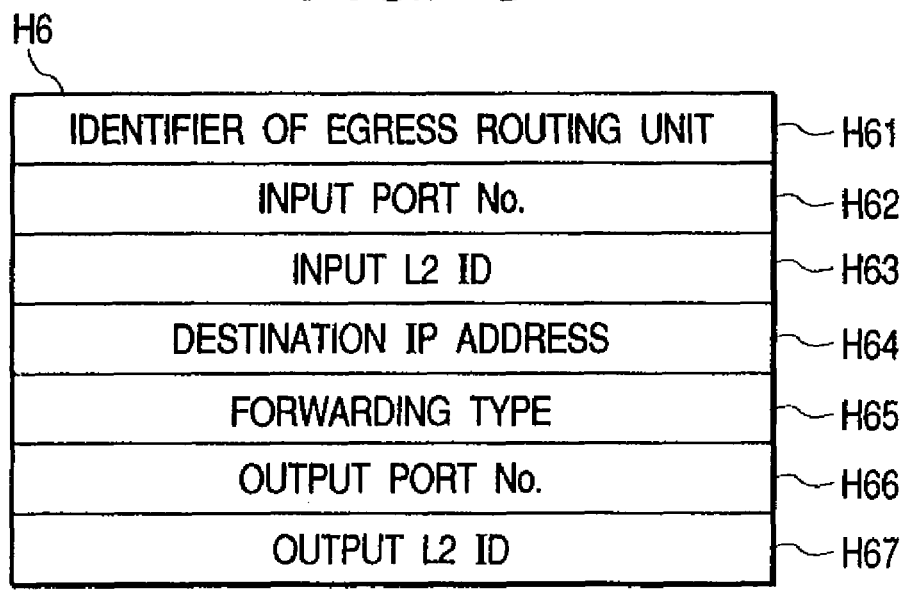
FIG. 5 shows an example of a format of an internal header H6.

The internal header H6 has, for example as shown in FIG. 5, an identifier H61 of an egress routing unit, input port number H62, an input L2 identifier H63, a destination IP address H64, a forwarding type H65, output port number H66, and an output L2 identifier H67. In the embodiment, the output line interface board 14 (14-1 to 14-*n*) is specified by the identifier H61 of the egress routing unit, and an output line in each of the output line interface boards is specified by the output port number H66. For example, the input port number H62 and the input L2 identifier H63 in the construction information of the internal header H6 are added by each of the input line interface units 30 and the other information is added by the ingress routing unit 20.

The switching unit 12 forwards a packet supplied from each of the input line interface boards 13 to the output line interface board 14 indicated by the identifier H61 of the egress routing unit in the internal header. In each of the output line interface boards 14, by the egress routing unit 40, packets received from the switching unit 12 are routed to the output line interface units 50 indicated by the output port numbers H66 each in the internal header. Each of the output line interface units 50 removes the internal header H6 from the reception packet, executes a header converting process of the layer 2 in accordance with the forwarding type H65 and the output L2 identifier H67, and then transmits the packet (or ATM cell) to the output line indicated by the output port number H66.

Figure 6:
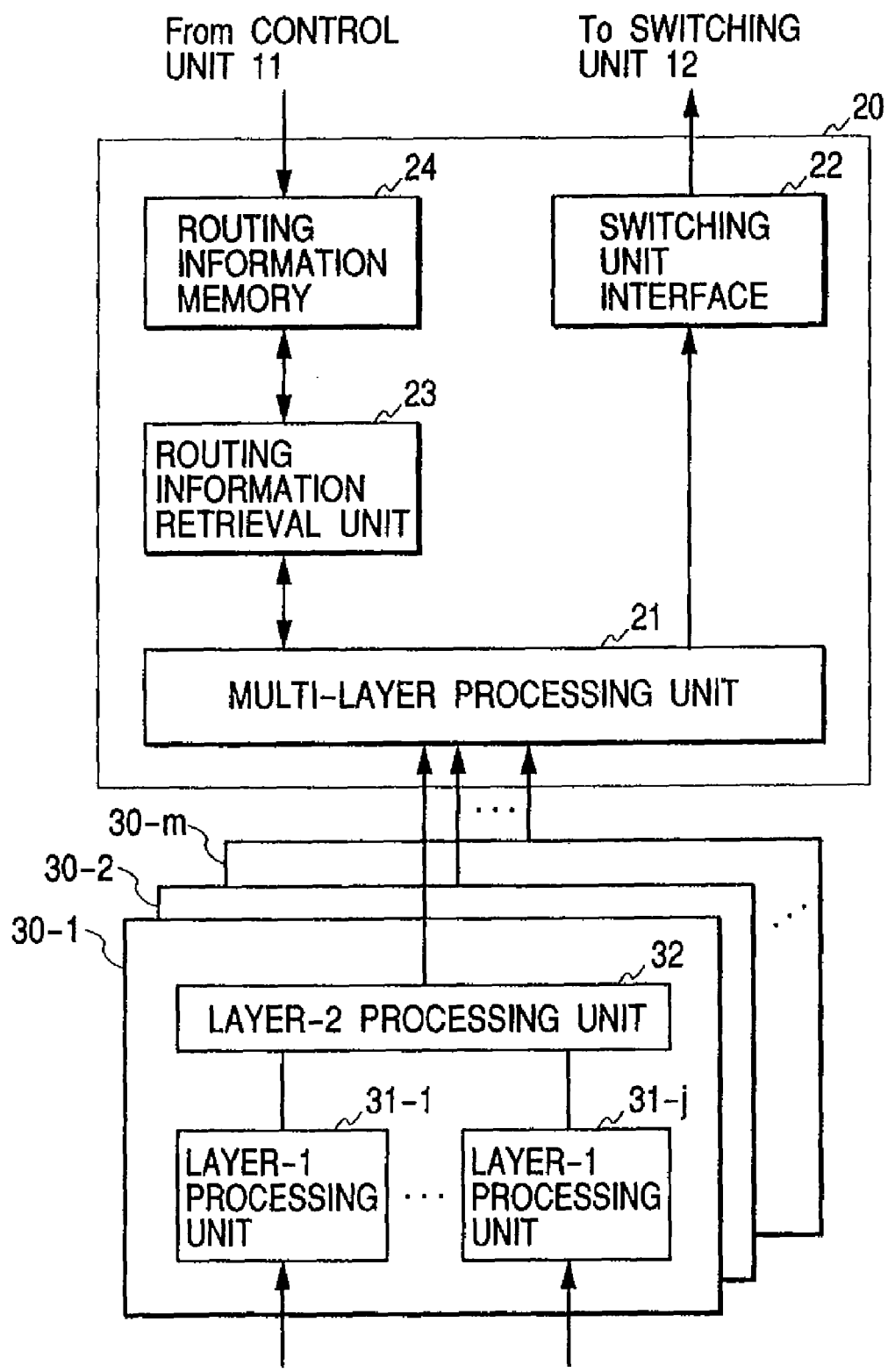
FIG. 6 shows a detailed structure of an input line interface board 13 illustrated in FIG. 3.

FIG. 6 shows the detailed construction of the input routing unit 20 and the input line interface unit 30 in the input line interface board 13.

The input line interface unit 30 comprises layer-1 processing units 31 (31-1 to 31-*j*) provided in correspondence with input lines and a layer-2 processing unit 32 connected to the layer-1 processing units 31. It is also possible to prepare the layer-2 processing unit 32 for each layer-1 processing unit 31, multiplex outputs of the plurality of layer-2 processing units 32 by a multiplexer and supply the resultant to the ingress routing unit 20. The layer-1 processing unit 31 performs a signal receiving process at the physical layer level of the communication line such as light-electricity conversion to input packets in the layer 2 to the layer-2 processing unit 32.

Figure 7:
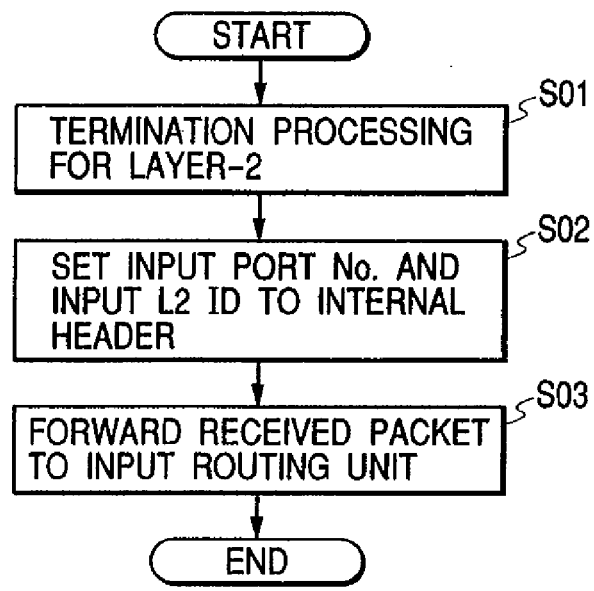
FIG. 7 is a flowchart showing the function of a layer-2 processing unit 32 illustrated in FIG. 6.

As shown in FIG. 7, the layer-2 processing unit 32 performs termination processing for the layer 2 on a reception packet from each of the layer-1 processing units 31 (step S01), sets the input port number H62 and the input L2 identifier H63, to the internal header H6 (S02) and forwards the reception packet to which the internal header is added to the ingress routing unit 20 (S03). The value of the input port number H62 to be set in the internal header is specified from the peculiar number of the layer-1 processing unit 31 which has received and processed the packet. The input L2 identifier H63 is specified by the contents of the L2 header H5 extracted from the reception packet.

The ingress routing unit 20 comprises, as shown in FIG. 6, a multi-layer processing unit 21 connected to the layer-2 processing unit 32 in each of the input line interface units 30 (30-1 to 30-*m*), a switching unit interface 22, a routing information retrieval unit 23, and a routing information memory 24 in which, for example, the routing information table 150 shown in FIG. 2 is stored. The multi-layer processing unit 21 and the routing information retrieval unit 23 may be formed on a single LSI.

Figure 8:
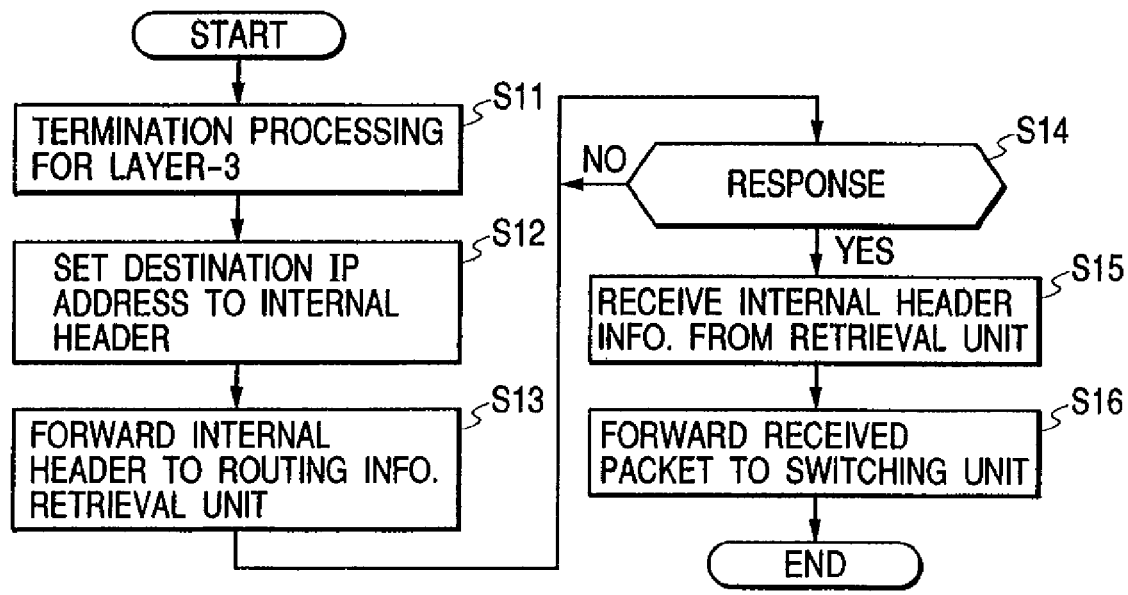
FIG. 8 is a flowchart showing the function of a multi-layer processing unit 21 illustrated in FIG. 6.

As shown in FIG. 8, the multi-layer processing unit 21 performs termination processing for layer-3 on a packet received from each of the input line interface units 30 (step S11), sets the destination IP address H13 extracted from the IP header as a destination IP address H64 in the internal header (S12), forwards the input port number H62, input L2 identifier H63, and destination IP address H64 as search keys of the routing information table to the routing information retrieval unit 13 (S13) and waits for a response from the routing information retrieval unit (S14).

Figure 9:
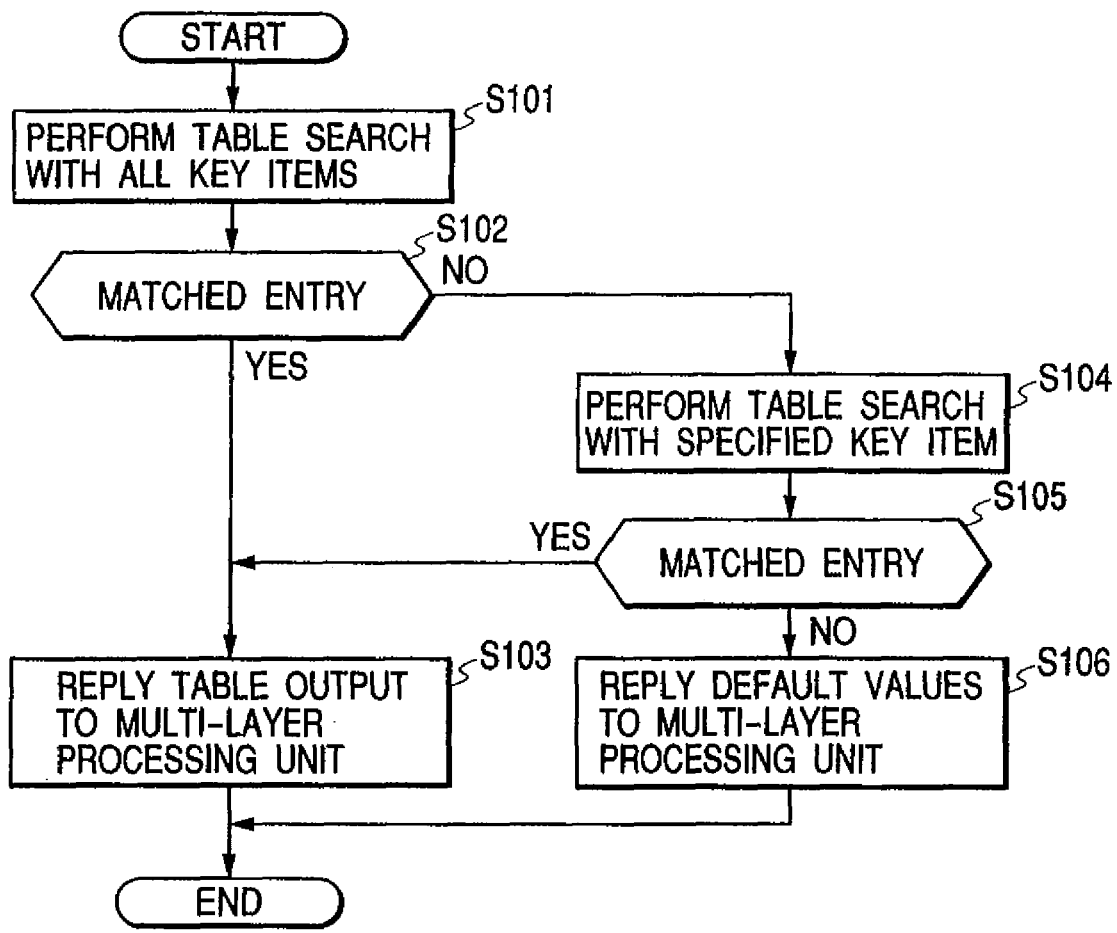
FIG. 9 is a flowchart showing the function of a routing information retrieval unit 23 illustrated in FIG. 6.

When search key information is received from the multi-layer processing unit 21, the routing information retrieval unit 13 searches the routing information table 150 by using all of given search key items (input port number H62, input L2 identifier H63 and destination IP address H64) as search conditions in accordance with the flowchart shown in FIG. 9 (step S101). The routing information retrieval unit 13 checks the search result (S102). When there is a table entry matching the search conditions, the routing information retrieval unit 13 replies the output information OUT1 (forwarding type, output port number and output L2 identifier) of the table entry to the multi-layer processing unit 21 (S103). In the embodiment, in the table entry hit by the search conditions of the first stage, the forwarding type OUT11 indicates the MPLS core forwarding (POS-POS).

When the search at the first stage fails, the destination IP address H64 is used as a search key and the routing table 150 is again searched (S104). When the search result is checked (S105) and there is a table entry which matches the search conditions, the output information OUT1 of the table entry (forwarding type, output port number and output L2 identifier) is returned to the multi-layer processing unit 21 (S103). In the embodiment, in the table entry hit by the search of the second stage, the forwarding type OUT11 indicates one of the MPLS edge-ingress forwarding, MPLS edge-egress forwarding, and IP forwarding. When the search of the second stage also fails, default values indicative of unknown routing information are replied to the multi-layer processing unit 21 (S106).

In the flowchart, the retrieval of the first stage is performed by using all of items defined as the input information IN1 in the routing information table as search conditions. In the embodiment, however, since the entry for MPLS core forwarding to be searched at the first stage has the destination IP address IN13 of "Don't Care Value", the search at the first stage may use two items of the input port number and the input L2 identifier as search conditions.

When the output information OUT1 is received from the routing information retrieval unit 23, as shown in FIG. 8, the multi-layer processing unit 21 sets the identifier H61 of the egress routing unit, forwarding type H65, output port number H66 and output L2 identifier H67 into the internal header (S15) and forwards the reception packet to the switching unit 12 via the switching unit interface 22 (S16) In this case, the identifier H61 of the egress routing unit corresponds to a few higher bits of the output port number OUT12 shown in the table entry and the output port number H66 corresponds to the rest of the bits of the output port number OUT12. The switching unit 12 forwards the packet received from each of the input interface boards 13 to the output interface board 14 indicated by the identifier H61 of the egress routing unit in the internal header.

Figure 10:
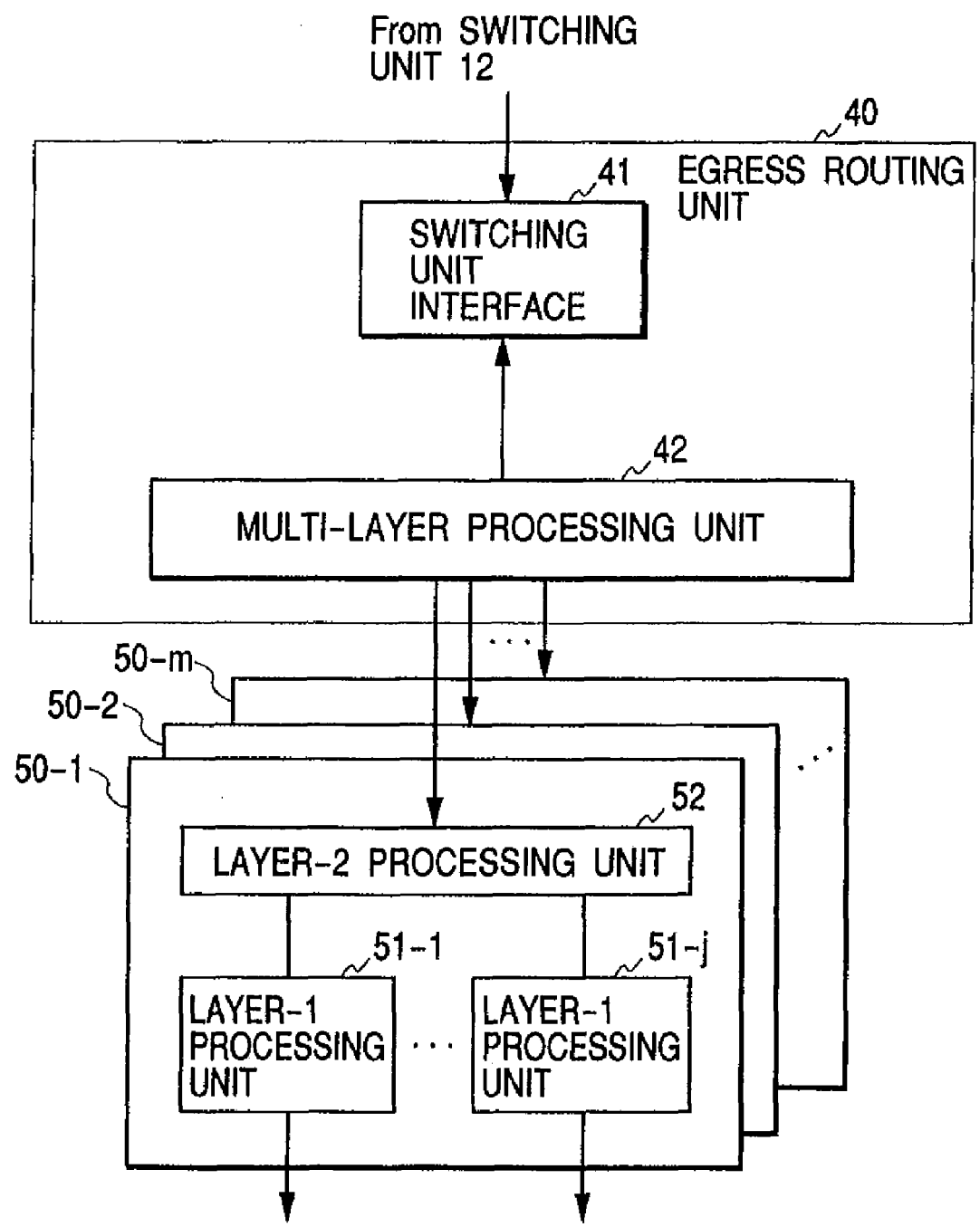
FIG. 10 shows a detailed structure of an output line interface board 14 illustrated in FIG. 3.

FIG. 10 shows detailed constructions of the egress routing unit 40 and the output line interface unit 50 in the output line interface board 14.

The output line interface unit 50 comprises layer-1 processing units 51 (51-1 to 51-*j*) provided in correspondence with output lines and a layer-2 processing unit 52 connected to the layer-1 processing units 51. The egress routing unit 40 has a switching unit interface 41 and a multi-layer processing unit 42 connected to the layer-2 processing unit 52 in each of the output line interface units 50 (50-1 to 50-*m*). Although the single layer-2 processing unit 52 is shared by the plurality of layer-1 processing units 51 in this case, it is also possible to provide a layer-2 processing unit 52 for each of the layer-1 processing units 51 and connect the plurality of layer-2 processing units 52 to the multi-layer processing unit 42, via a demultiplexer.

Figure 11:
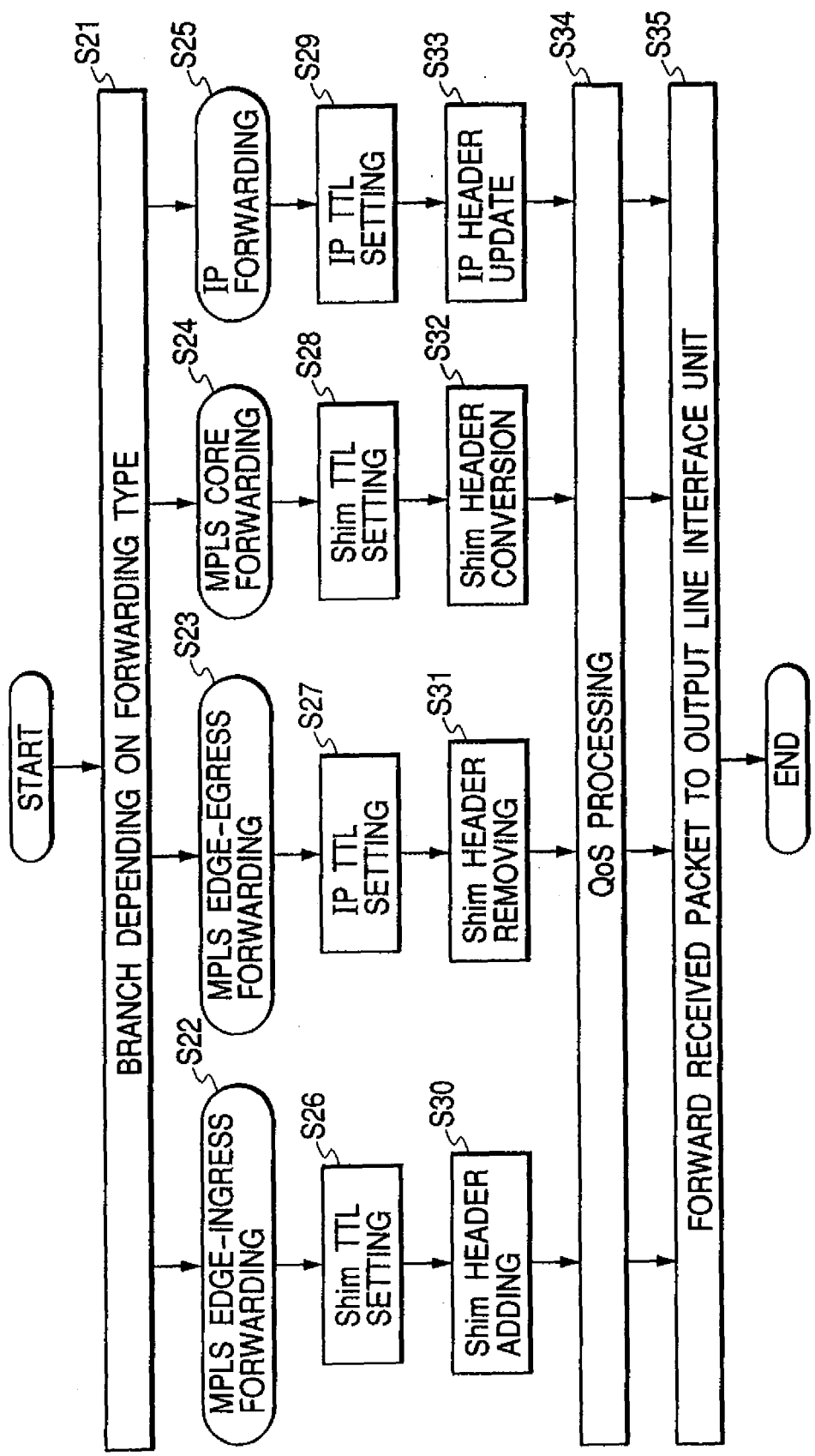
FIG. 11 is a flowchart showing the function of a multi-layer processing unit 42 illustrated in FIG. 10.

When a packet with the internal header is received via the switching unit interface 41, as shown in FIG. 11, the multi-layer processing unit 42 advances to one of the routines of the MPLS edge-ingress forwarding (S22), MPLS edge-egress forwarding (S23), MPLS core forwarding (S24) and IP forwarding (S25) in accordance with the forwarding type H65 included in the internal header (S21). The multi-layer processing unit 42 executes a TTL (Time To Live; it is similarly done by hop number) process (S26, S27, S28 or S29) and a header converting process (S30, S31, S32 or S33) in accordance with the forwarding type. In the embodiment, the multi-layer processing unit 42 performs the header converting process on the MPLS header and the IP header. As described above, when it is regarded that the MPLS is in the layer 2.5, the multi-layer processing unit 42 executes a protocol process regarding a layer higher than the layer-2 processing unit 52.

For example, in the case of the MPLS edge-ingress forwarding, after subtracting by 1 from the value of TTL H11 included in the IP header H1 by the TTL process (S26), the Shim header H4 (refer to FIG. 26) including the resultant value as TTL H42 is generated. In the header converting process (S30) the value indicated by the output L2 identifier H67 of the internal header H6 is set in the label H41 in the Shim header H4 and the Shim header H4 is inserted before the IP header in the reception packet (IP packet).

In the case of the MPLS edge-egress forwarding, after subtracting by 1 from the value of TTL H42 included in the Shim header H4 of the reception packet by the TTL process (S27), the resultant value is set in the TTL H11 in the IP header H1. In the header converting process (S31), the Shim header H4 is eliminated from the reception packet (MPLS packet).

In the case of the MPLS core forwarding (POS-POS forwarding in the embodiment), after subtracting by 1 from the value of the TTL H42 included in the Shim header H4 of a reception packet, the value of the label H41 included in the Shim header H4 of the reception packet is converted to a value indicated by the output L2 identifier H67 in the internal header H6.

In the case of the IP forwarding, after subtracting by 1 from the value of the TTL H11 included in the IP header H1 by the TTL process (S29), a part of the IP header information such as the value of Header Checksum H52 is updated by the header converting process S33.

After the TTL process and the header converting process according to the packet forwarding type, the multi-layer processing unit 42 executes a QoS (Quality of Service) process (S34) and forwards the reception packet to the output line interface board 50 corresponding to the output port number H66 (S35).

Figure 12:
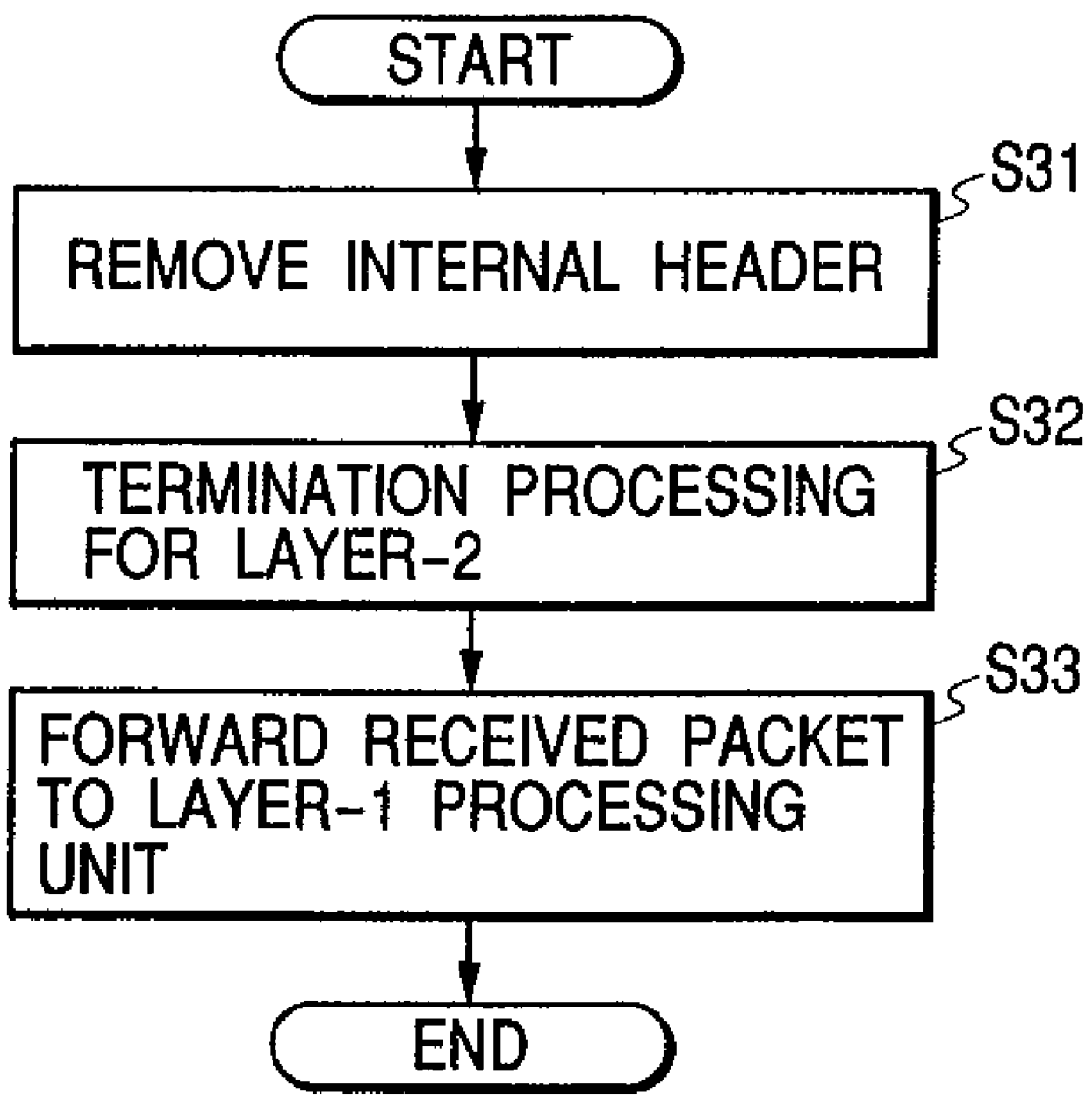
FIG. 12 is a flowchart showing the function of a layer-2 processing unit 52 illustrated in FIG. 10.

When a packet is received from the egress routing unit 40, as shown in FIG. 12, the layer-2 processing unit 52 in each of the output line interface boards 50 eliminates the internal header H6 from the reception packet (step S31). After executing a layer-2 protocol process (S32) on a packet to be transmitted, the layer-2 processing unit 52 forwards the transmission packet to the layer-1 processing unit 31 corresponding to the output port number H66 in the internal header 6. In each of the layer-1 processing units 31, the transmission packet received from the layer-2 processing unit 52 is converted into a predetermined signal in a physical layer and the resultant signal is transmitted to the corresponding output line.

For example, in the case where the output line is an ATM line, in the layer-2 protocol process (S32) the transmission packet is divided into a plurality of data blocks (payloads) each having 48-byte length and a cell header including the VPI/VCI indicated by the output L2 identifier H67 in the internal header is added to each of the data blocks, thereby converting the transmission packet into a plurality of ATM cells. In the case where the output line is an IP network of Ethernet, an Ethernet header H2 including the MAC address indicated by the output L2 identifier H67 in the internal header is generated by the layer-2 protocol process (S32), and is added to a transmission packet.

Although the protocol process (TTL process and header converting process) according to the packet forwarding type is executed by the egress routing unit 40 in the foregoing embodiment, the protocol process may be performed by the ingress routing unit 20. In this case, for example, a protocol processing unit for executing the TTL process and the header converting process is disposed between the multi-layer processing unit 21 and the switching unit interface 22 shown in FIG. 6 and a packet which has been subjected to the converting process of the MPLS header and the IP header is sent to the switching unit 11. The functions of the multi-layer processing units 21 and 42 and the functions of the routing information retrieval unit 23 and the protocol processing unit shown in the flowcharts can be realized by a high-speed system LSI chip by the semiconductor technique such as gate array or ASIC.

FIG. 13 shows a network partially including a virtual private network VPN formed by MPLS nodes, according to a second embodiment of the invention.

In the embodiment, the MPLS domain D2 comprises edge nodes E21, E22 and E23 and core nodes C21 and C22. The core nodes C21 and C22 and the routers R21, R22, R23 and R24 on the IP network side are connected to the edge node E21 on which attention is focused. Among the routers, the routers R21 and R22 are connected to the input/output port of the port number #21 in the edge node E21 via a multiplexing apparatus (L2MUX) X21 such as an ATM multiplexing apparatus. The routers R23 and R24 are connected to the input and output ports of the port numbers #22 and #23 of the edge node E21, respectively. Routers R25 and R26 of the IP network are connected to the other edge nodes E22 and E23, respectively.

In FIG. 13, a host IP21 connected to the router R21 and a host IP22 connected to the router R25 construct a virtual private network VPN-A. A host IP21 connected to the router R22 and a host IP22 connected to the router R26 construct another virtual private network VPN-B. In the virtual private network, private IP addresses can be used in each network (VAN). Consequently, if VANs are different from each other, IP addresses used may be overlapped.

It is defined here that a route of an IP packet transmitted from the host IP21 in the VPN-A to the host IP22 in the VPN-A is RT21 and a route of an IP packet transmitted from the host IP21 in the VPN-A to the host IP23 connected to the router R23 is RT22. It is also defined that a route of an IP packet transmitted from the host IP21 in the VPN-B to the host IP22 in the VPN-B is RT23 and a route of an IP packet transmitted from the host IP21 in the VPN-B to the host IP24 connected to the router R24 is RT24. It is assumed that L2 MUX X21 and the edge node E21 are connected via an ATM line, the packet of RT21 is ATM multiplexed by a VPI/VCI value "VCIv21", the packet of RT22 is ATM multiplexed by a VPI/VCI value "VCIv22" and packets of RT23 and RT24 are ATM multiplexed by VPI/VCI values "VCIv23".

In the embodiment, the edge node E21 has a routing information table 160 shown in FIG. 14. Each of the entries in the table 160 has items similar to those in the table 150 shown in the first embodiment and includes entries EN201 to EN204 corresponding to RT21 to RT24.

The network of FIG. 13 includes not only the routes shown in the diagram but also, for example, MPLS edge-egress forwarding routes for forwarding packets from the MPLS domain D2 to the external ATM lines in the direction opposite to the routes RT21 and RT23, an MPLS edge-ingress forwarding route for forwarding a packet from the host IP24 to the host IP22 in the VPN-B, an MPLS edge-egress forwarding route opposite to the MPLS edge-ingress forwarding router and an MPLS core forwarding route for switching packets in the MPLS domain D2. The routing information table 160 therefore includes table entries of forwarding types other than the entries EN201 to EN204. These entries are substantially the same as those in the first embodiment which have been described except for the contents of the input/output L2 identifier. Consequently, the description is omitted here.

When attention is paid to the route RT21 in the network of FIG. 13, a packet transmitted from the host IP21 in the VAN-A to the host IP22 is converted to ATM cells each having VPI/VCI value "VCIv22" by the L2 MUX X21, and these ATM cells is supplied to the input port of the port number #21 in the edge node E21. Consequently, when the table search at the first stage (step S101 in FIG. 9) is executed by using the port number "#21", the input L2 identifier "VCIv22", and the destination IP address "P22" as search conditions in the routing information retrieval unit 23, the table entry EN201 is retrieved.

When attention is paid on the route RT22, a packet transmitted from the host IP21 in the VAN-A to the router host IP23 is converted to ATM cells by the L2 MUX X21 in a manner similar to the route RT21, and these ATM cells are supplied from the input port of the port number #21 to the edge node E21. In this case, since the VPI/VCI value of each ATM cell is "VCIv23", the table entry EN202 is retrieved by the table search at the first stage by the routing information retrieval unit 23.

Packets of the routes RT23 and RT24 are converted to ATM cells having the same VPI/VCI value "VCIv23" by the L2MUX X21. These ATM cells are supplied to the edge node E21 from the input port of the port number "#21". Since the destination IPS addresses of the packets are "IP22" in the route RT23 and "IP24" in the route RT24, the table entry EN203 is retrieved for the reception packet of the route RT23 and the table entry EN204 is retrieved for the reception packet of the route RT24 by the table search at the first stage by the routing information retrieval unit 23.

Even in the case where the edge nodes in the MPLS domain are connected to the VPNs and the same destination IP address indicates different destination apparatuses according to the VPNs, in a manner similar to the first embodiment, by searching the routing information table by using the combination of the input port number, input L2 identifier, and destination IP address as searching conditions, packet forwarding to the output route corresponding to the reception packet and the protocol process according to the packet forwarding type can be executed.

In the embodiment, the case (case 1) where the value of the L2 identifier (VPI/VCI) in the route RT21 and that in the route RT22 are different from each other and the case (case 2) where the value of the L2 identifier in the route RT23 and that in the route RT24 are the same even when packets are transmitted from the same host to different destinations have been described. For example, when the destination IP address is a peculiar address which is not used in the other apparatus like the host IP23 in the route RT22, "Don't Care Value" may be set for each of the input port IN11 and the input L2 identifier IN12 of the corresponding table entry. When the VPN can be identified only by the input port number in the edge node E21, "Don't Care Value" or a hyphen (it denotes that the search condition is not satisfied) may be set in the input L2 identifier IN12. The item can be substantially eliminated from the search conditions.

In the embodiment shown in FIG. 14, to make the explanation simpler, the output L2 identifier OUT13 is designated by one label value. It is also possible to designate a plurality of labels as the output L2 identifiers and, for example, like a label stack described in the draft of the IETF, it is also possible to insert two Shim headers H4 of the MPLS. In the VPN using the MPLS, for example, there is a case such that VPN identification information is necessary as a first label and routing information to a neighboring MPLS node is necessary as a second label. In such a case as well, it is sufficient to set the two label values as the output L2 identifier OUT13 of the routing information table 160.

Figure 15:
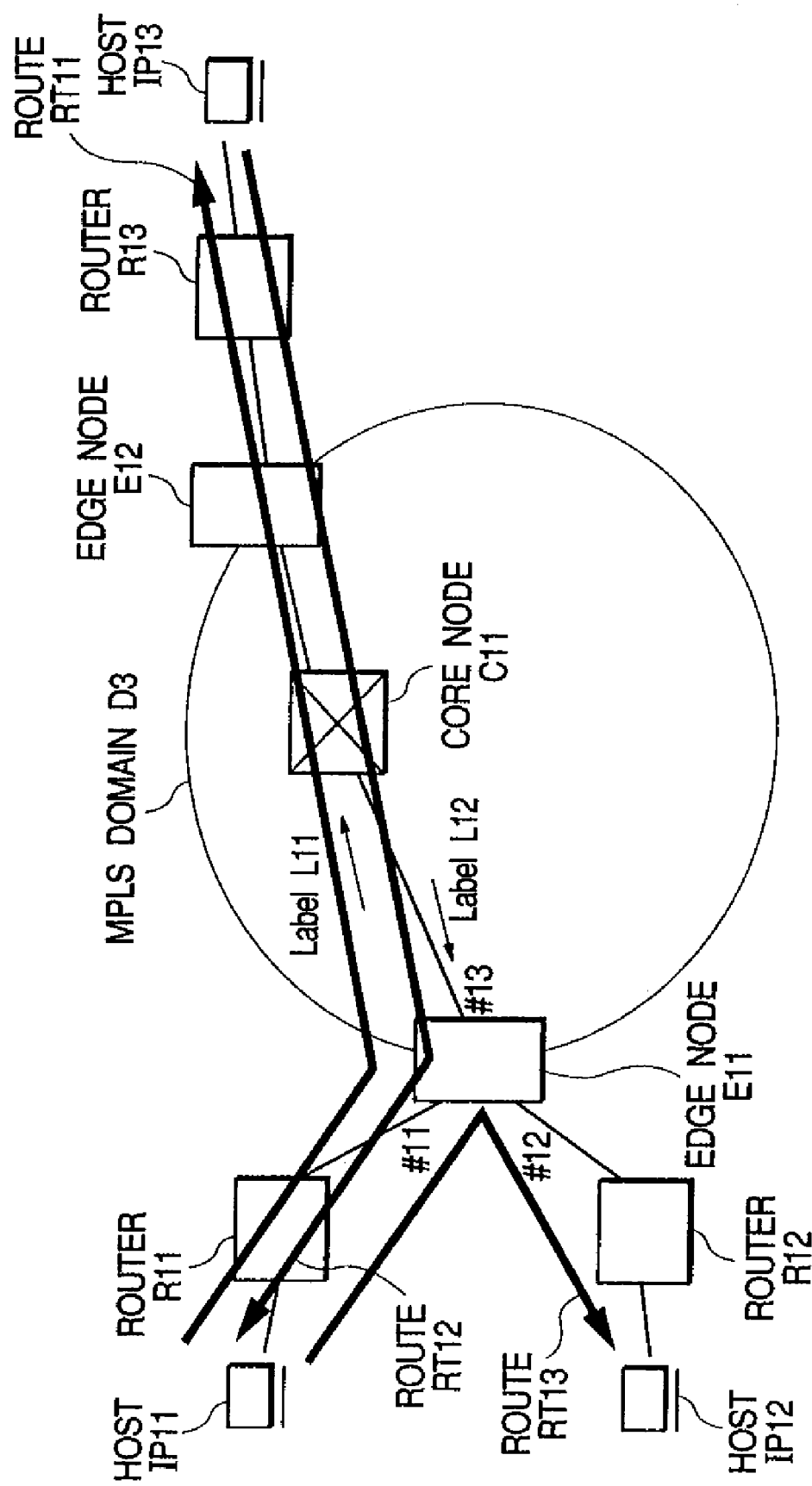
FIG. 15 shows a third embodiment of a network to which the packet forwarding apparatus of the invention is applied.

FIG. 15 shows an example of a network-construction as a third embodiment of the invention, in which the use of an edge node in the MPLS domain is preliminarily limited, thereby enabling the search of the routing information table to be simplified.

In the case of executing the MPLS core forwarding described in the first embodiment and the MPLS edge forwarding of the VPN described in the second embodiment, the input port number and the input L2 identifier are necessary as search conditions of the routing information table. When the use of the edge node in the MPLS domain is limited and it is unnecessary to perform the MPLS core forwarding and the MPLS edge forwarding of the VPN, only the destination IP address is necessary as the search condition of the routing information table.

For example, if there is no core node C12 in the network shown in FIG. 1, the network construction is as shown in FIG. 15 and the edge node E11 is related to the route RT11 of an IP packet transmitted from the host IP11 to the host IP13, the route RT12 of an IP packet which is in the direction opposite to the route RT11, and the route RT13 of an IP packet transmitted from the host IP11 to the host IP12. In this case, only the IP forwarding function and the MPLS edge forwarding function are necessary for the edge node E11. In the network construction shown in the diagram, besides the above routes, the route for forwarding a packet between the hosts IP12 and IP13 and the route of a packet transmitted from the host IP12 to the host IP11 exist. Since the packet forwarding over the routes is similar to that over the routes RT11 to RT13, the description is omitted here.

In the case of the above network construction, a routing information table 170 of the edge node E11 is obtained by, as shown in FIG. 16, omitting the entry EN104 for the route RT14 from the table 150 shown in FIG. 2. All of table entries of the routing information table 170 have the contents which are hit in the searching step S104 of the second stage in the routing information retrieving flowchart shown in FIG. 9. Consequently, when it is preliminarily known that the network construction does not need the search (S101) of the first stage like the embodiment, the following manner can be used. In order to increase the processing speed of the edge node, steps S101 and S102 are omitted from the routing information retrieving flowchart shown in FIG. 9 and the routing information retrieval unit 23 searches the routing information table by using only the destination IP address as a search condition from the beginning.

In this case, the input port IN11 and the input L2 identifier IN12 are unnecessary in the routing information table 170. Whether those items are left in the table or eliminated is determined depending on prediction of a change in an environment to which the core node is applied. In order to make the change in the network construction remain flexible, the table construction is left as it is and only the routing information retrieving function is made adapted to the present network construction. When the retrieval of two stages becomes necessary, only the function of the routing information retrieval unit 23 is changed to the state of FIG. 9.

Figure 17:
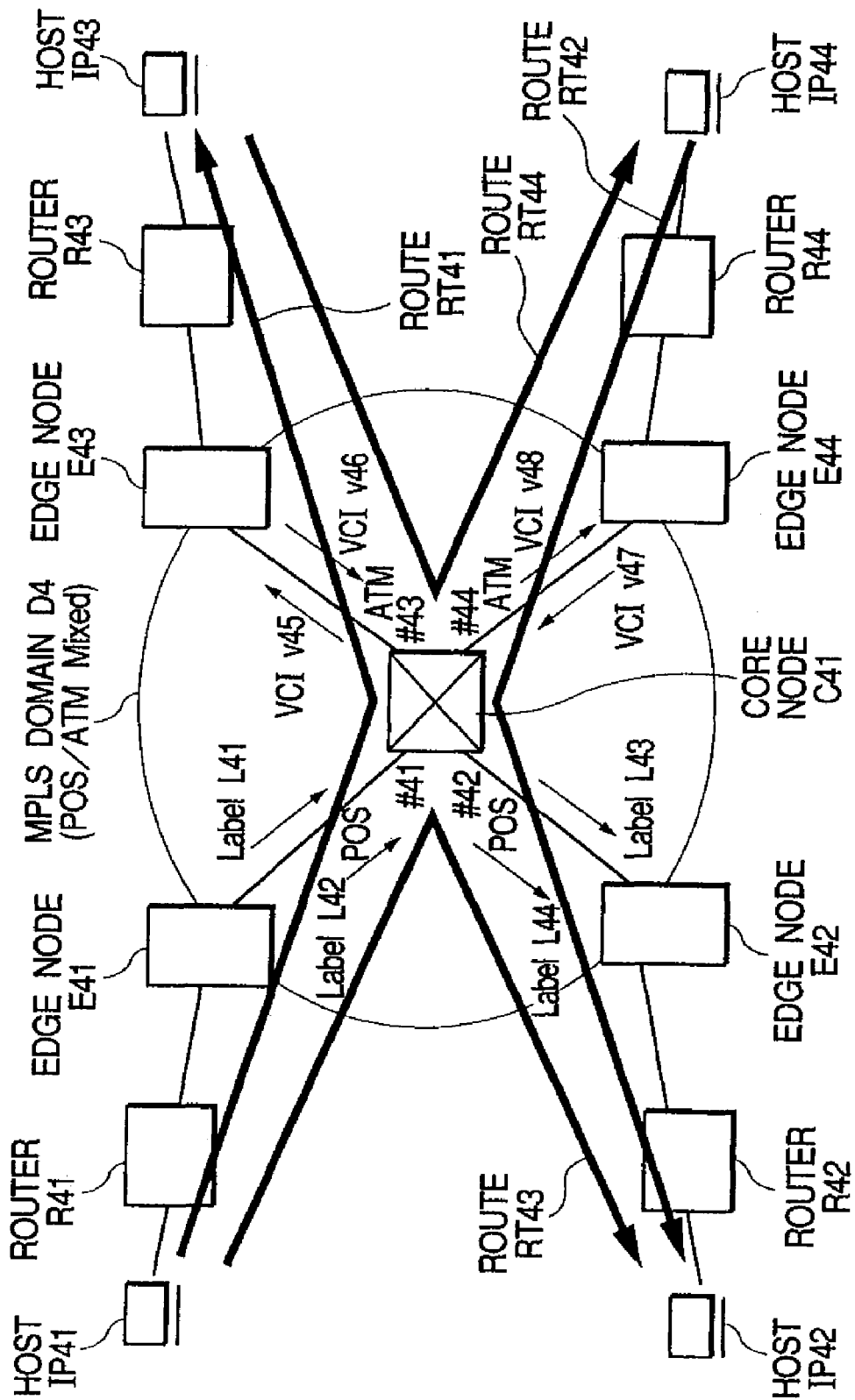
FIG. 17 shows a fourth embodiment of a network to which the packet forwarding apparatus of the invention is applied.
Figure 22:
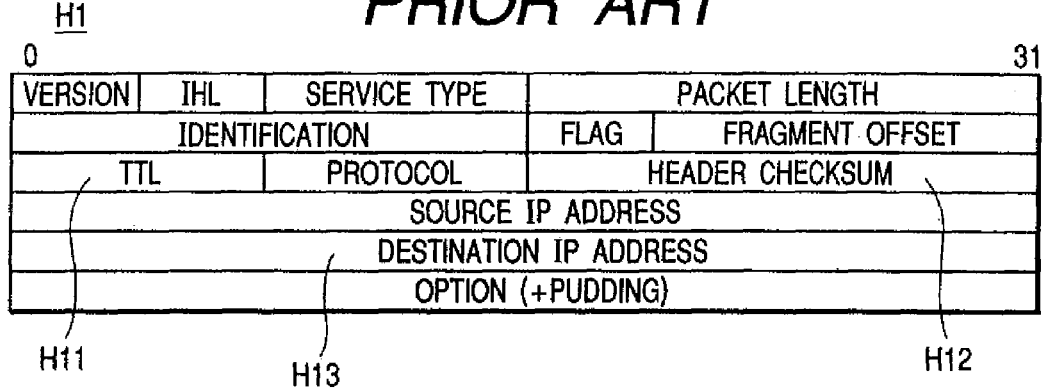
FIG. 22 shows a format of an IP packet header.
Figure 23:
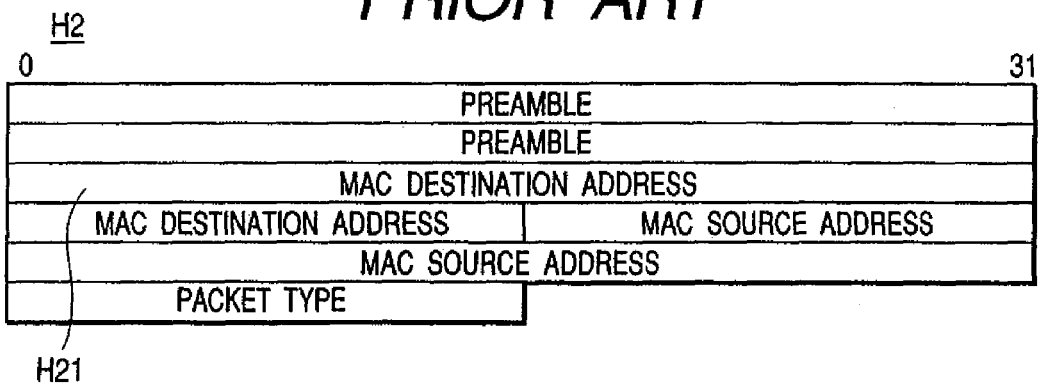
FIG. 23 shows a format of an Ethernet header.

FIG. 17 shows an example of the network construction in which POS lines and ATM lines are included in an MPLS domain D4 as a fourth embodiment of the invention.

The MPLS domain D4 comprises edge nodes E41 to E44 and a core node C41 for mutually connecting the edge nodes. Hosts IP41 to IP44 are connected to the edge nodes E41 to E44 via routers R41 to R44, respectively. In the embodiment, attention is paid only to the MPLS core forwarding performed by the core node C41 and is not paid to the IP forwarding and the MPLS edge forwarding described in the first embodiment and the packet forwarding for the VPN described in the second embodiment. The core node C41 performs communications with the edge nodes E41 and E42 over the POS lines and performs communications with the edge nodes E43 and E44 via ATM lines. The core node C41 has, for example, a routing information table 180 shown in FIG. 18. In the MPLS communication using ATM lines, in a manner similar to the MPLS communications in POS or Ethernet, there are two cases; a case of using a Shim header and a case of using the VPI/VCI of the ATM header as a label in place of the Shim header. The latter case will be described here.

In the network of FIG. 17, it is assumed that a route of an IP packet transmitted from the host IP41 to the host IP43 is RT41, a route of an IP packet transmitted from the host IP44 to the host IP42 is RT42, a route of an IP packet transmitted from the host IP41 to the host IP42 is RT43, and a route of an IP packet transmitted from the host IP43 to the host IP44 is RT44.

In this case, the routing information table 180 of the core node C41 includes, as shown in FIG. 18, table entries EN401 to EN404 corresponding to the routes RT41 to RT44, respectively. "Label L41" and "Label L42" indicated as the input L2 identifiers IN12 denote values of labels H41 to be added to the Shim headers of the MPLS of packets on the routes RT41 and RT43 received from the POS lines connected to the input port of the port number #41. "VCIv47" and "VCIv46" indicate values of the VPI/VCI to be added as labels to packets on the routes RT42 and RT44 received through ATM lines connected to the input ports of the port numbers #44 and #43, respectively.

When the core node C41 receives the MPLS packets of the routes RT41 to RT44, the routing information retrieval unit 23 in the input routing unit 20 corresponding to each input line searches the routing information table 180 by the procedure shown in FIG. 9. In the embodiment, the table entries EN401 to EN404 are retrieved in the table searching step S101 at the first stage in correspondence with the reception packets of the routes RT41 to RT44. By the multi-layer processing unit 42 in the output routing unit 40, the protocol process corresponding to the forwarding type OUT11 of each of the entries is executed.

FIG. 19 shows the flowchart of the protocol process executed by the multi-layer processing unit 42 in the embodiment.

When a packet with the internal header is received via the switching interface 41, in accordance with the forwarding type H65 included in the internal header, the multi-layer processing unit 42 advances one of the processing routines (S21); the MPLS core (POS-ATM) forwarding for forwarding a reception packet from the POS line to the ATM line (S241), MPLS core (ATM-POS) forwarding for forwarding a reception packet from the ATM line to the POS line (S242), MPLS core (POS-POS) forwarding for forwarding a reception packet from the POS line to the POS line (S243), and MPLS core (ATM-ATM) forwarding for forwarding a packet from the ATM line to the ATM line (S244).

Figure 24:
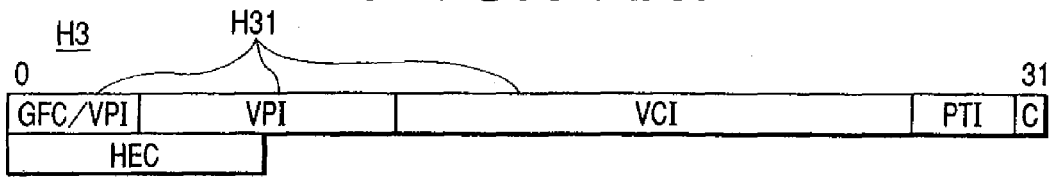
FIG. 24 shows a format of an ATM cell header.

As obviously understood from the ATM header format shown in FIG. 24, the ATM header does not include TTL information. In each of the MPLS core forwarding of POS-ATM, ATM-POS, and POS-POS (S241 to S243), a TTL (Time To Live: similar with the hop count) process (S281, S282 or S283) and a header converting process (S321, S322 or S323) are performed in accordance with the forwarding type. In the MPLS core (ATM-ATM) forwarding (S244), the TTL process and the header converting process in the layer are omitted.

For example, in the TTL process (S281) of the MPLS core (POS-ATM) forwarding (S241) performed by a node positioned at the entrance of the ATM line section, the number k of MPLS nodes (MPLS hop count) through which the reception packet passes in the ATM line section is subtracted from the value of TTL H42 extracted from the Shim header of the reception packet and the resultant value is set as the TTL H11 of the IP packet. In the header converting process (S321), the Shim header H4 is removed from the reception packet (MPLS packet) and the VPI/VCI value indicated by the output L2 identifier H67 in the internal header H6 is added as a new label to the reception packet.

By preliminarily subtracting the number of hops in the ATM line section in a lump by the TTL process (S281), even when each of the MPLS nodes positioning in the ATM line section performs the MPLS core (ATM-ATM) forwarding which does not include the TTL process (S244), the accurate TTL can be transmitted to the node positioning at the exit of the ATM line section.

In the TTL process (S282) of the MPLS core (ATM-POS) forwarding (S242) performed by the node positioning at the exit of the ATM line section, after subtracting by 1 from the value of the TTL H11 included in the IP header H1 of the reception packet, the resultant is set as the TTL H42 in the Shim header H4. In the header converting process (S322), the Shim header H4 is added to the reception packet (MPLS packet). As the label H41 of the Shim header H4, the value indicated by the output L2 identifier H67 in the internal header H6 is set.

In the TTL process (S282) of the MPLS core (POS-POS) forwarding (S243) for forwarding a reception packet from a POS line to a POS line, 1 is subtracted from the value of the TTL H42 included in the Shim header H4 of the reception packet. In the header converting process (S323), the value of the label H41 included in the Shim header H4 of the reception packet is changed to the value indicated by the output L2 identifier H67 in the internal header H6.

When the processing routines S241 to S244 shown in FIG. 19 are applied in place of the MPLS core forwarding process routine S24 in the multi-layer processing unit shown in FIG. 11, the edge node E11 in the first embodiment can be provided with the core forwarding function between ATM lines and between the ATM line and the POS line as described in the fourth embodiment. Since the table entries EN401 to EN404 for MPLS core forwarding shown in the routing information table 180 can be specified by a combination of the input port number IN11 and the input L2 identifier IN12 in a manner similar to the first embodiment, "Don't Care Value" can be set in the destination IP address IN13 in each of the entries.

As obviously understood from the embodiments, the packet forwarding apparatus of the invention can be connected with a number of kinds of communication lines of different communication protocols and can easily realize a number of kinds of protocol conversions according to combinations of input/output lines. Basically, apparatuses of the same structure can satisfy various network demands. The packet forwarding apparatus of the invention can therefore reduce the cost by mass production. When the apparatus of the invention is applied, the construction of a network can be flexibly expanded or changed. It therefore facilitates a shift to a network construction of a different communication protocol and the maintenance and control of a node.

According to the present invention, since the label switching type packet forwarding apparatus has a routing information table in which the packet forwarding type is designated in correspondence with the routing information peculiar to the reception packet which is known at the time of receiving a packet, it is able to forward packets between lines of different protocols by performing the header converting process of a reception packet in accordance with the packet forwarding type designated in the routing information table.

What is claimed:

1. A Multi Protocol Label Switching (MPLS) system for interconnecting Internet Protocol (IP) network regions, the MPLS system comprising edge nodes for connecting said IP network regions to the MPLS system and core nodes for interconnecting said edge nodes, said edge nodes including a label switching type packet forwarding apparatus capable of transmitting and receiving packets in plural communication protocols and comprising:

a plurality of input ports for receiving packets in said plurality of communication protocols;

a plurality of output ports for transmitting packets in said plurality of communication protocols; and a processing unit for performing a header converting process of each input packet received by one of said input ports in accordance with an output routing information of a specific layer in the Open Systems Interconnection (OSI) reference model determined upon receiving the packet, and for outputting the input packet as one of output packets to one of said output ports specified by output port identification information determined upon receiving the packet, wherein said label switching type packet forwarding apparatus is provided with a routing information table including a plurality of table entries each defining a combination of routing information of a plurality of layers in the OSI reference model, wherein said input ports include a first group of ports to be coupled to communication lines for said Internet Protocol (IP) network regions and a second group of ports to be coupled to communication lines for said core nodes, and said output ports include a third group of ports to be coupled to communication lines for said IP network regions and a fourth group of ports to be coupled to communication lines for said core nodes, and wherein said processing unit is configured so as to determine each of said output routing information of the specific layer in the OSI reference model and said output port identification information by referring to said routing information table, in correspondence with the combination of routing information of said plurality of layers in the OSI reference model.

2. The Multi Protocol Label Switching (MPLS) system according to claim 1, wherein each of said output routing information of the specific layer in the OSI reference model and said output port identification information is determined in correspondence with a destination Internet Protocol (IP) address of the input packet.

3. The Multi Protocol Label Switching (MPLS) system according to claim 1, wherein said processing unit performs said header converting process in accordance with each of the output routing information in correspondence with a packet forwarding type of the input packet, the packet forwarding type being a first forwarding type indicative of a packet forwarding between the IP network regions, a second forwarding type indicative of a packet forwarding from one of said IP network regions to the MPLS system, or a third forwarding type indicative of a packet forwarding from the MPLS system to one of said IP network regions.

4. The Multi Protocol Label Switching (MPLS) system according to claim 3, wherein the routing information of layer 2 in the OSI reference model to be attached to an output IP packet is designated as the output routing information in each of the first and the third forwarding type, and a label to be attached to an output MPLS packet is designated as the output routing information in the second forwarding type.

5. The Multi Protocol Label Switching (MPLS) system according to claim 1, wherein said processing unit performs said header converting process in accordance with each of the output routing information in correspondence with a packet forwarding type of the input packet, the packet forwarding type being a first forwarding type indicative of a packet forwarding between said IP network regions, a second forwarding type indicative of a packet forwarding from one of said IP network regions to the MPLS system, a third forwarding type indicative of a packet forwarding from the MPLS system to one of said IP network regions, or a fourth forwarding type indicative of a packet forwarding within the MPLS system.

6. The Multi Protocol Label Switching (MPLS) system according to claim 1, wherein said processing unit can forward a packet, in the MPLS system, between a first network region to which a first protocol in a layer 2 of the OSI reference model is applied and a second network region to which a second protocol in the layer 2 of the OSI reference model is applied.

7. The Multi Protocol Label Switching (MPLS) system according to claim 6, wherein the routing unit can forward one of said input packets from a communication line for the first network region to another communication line for the first network region, and the routing unit can forward one of said input packets from a communication line for the second network region to another communication line for the second network region.

8. A Multi Protocol Label Switching (MPLS) domain system for interconnecting Internet Protocol (IP) network regions, the MPLS system comprising edge nodes for connecting said IP network regions to the MPLS system and core nodes for interconnecting said edge nodes, said core nodes including a label switching type packet forwarding apparatus capable of transmitting and receiving packets in plural communication protocols and comprising:

a plurality of input ports for receiving input packets from the MPLS system in which the input packets were communicated according to Multi Protocol Label Switching (MPLS);

a plurality of output ports for transmitting output packets to the MPLS system; a routing information table including a plurality of table entries, each of which defines a combination of routing information of a plurality of layers in an Open System Interconnection (OSI) reference model; and a processing unit which determines output routing information in correspondence with a combination of first information indicative of the input port of one of said input packets, second information indicative of either said MPLS of the input packet or routing information of layer 2 in the OSI reference model and third information indicative of a destination Internet Protocol (IP) address of the input packet, which converts the input packet in accordance with the output routing information of a specific layer in the OSI reference model determined upon receiving the input I packet, and which outputs the input packet as one of said output packets to one of said output ports specified by output port identification information determined upon receiving the input packet, and wherein each of the output routing information of the specific layer in the OSI reference model and the output port identification information is determined in correspondence with the combination of said first information indicative of the input port of the input packet, said second information indicative of either the MPLS label of the input packet or the routing information of the layer 2 in the OSI reference model and said third information indicative of the destination IP address of the inputted packet.

9. The Multi Protocol Label Switching (MPLS) system according to claim 8, wherein when the output routing information of the specific layer in the OSI reference model and the output port identification information corresponding with the first, the second and the third information cannot be determined, the output routing information of the specific layer in the OSI reference model and the output port identification information are determined by using the third information.

* * * * *